US011001096B2

(12) United States Patent
Thomson et al.

(10) Patent No.: US 11,001,096 B2
(45) Date of Patent: May 11, 2021

(54) METHOD OF APPLYING ARTWORK TO A 3D PLATE

(71) Applicant: IdeaStream Consumer Products, LLC, Cleveland, OH (US)

(72) Inventors: Vincent Thomson, Avon Lake, OH (US); Zhenghong Li, Cleveland, OH (US); Duane Duan, Cleveland, OH (US)

(73) Assignee: IdeaStream Consumer Products, LLC, Cleveland, OH (US)

( * ) Notice: Subject to any disclaimer, the term of this patent is extended or adjusted under 35 U.S.C. 154(b) by 0 days.

(21) Appl. No.: 16/542,659

(22) Filed: Aug. 16, 2019

(65) Prior Publication Data

US 2020/0062026 A1 Feb. 27, 2020

Related U.S. Application Data

(60) Provisional application No. 62/721,372, filed on Aug. 22, 2018.

(51) Int. Cl.
  *B44F 1/08* (2006.01)
  *B44C 5/04* (2006.01)
  *B44F 7/00* (2006.01)

(52) U.S. Cl.
  CPC .............. *B44F 1/08* (2013.01); *B44C 5/0415* (2013.01); *B44F 7/00* (2013.01); *B29C 2795/007* (2013.01)

(58) Field of Classification Search
  CPC . B44F 1/08; B44F 7/00; B44C 5/0415; B44C 1/24; B44D 3/18; B29C 59/02; B29C 59/022; B29C 39/02; B29C 65/48; B29C 65/00; B29D 99/0035
  See application file for complete search history.

(56) References Cited

U.S. PATENT DOCUMENTS

| | | | |
|---|---|---|---|
| 1,592,557 A | 7/1926 | Connor | |
| 5,587,036 A | 12/1996 | Utsch et al. | |
| 8,669,325 B1 * | 3/2014 | Hyman | B44C 3/048 524/609 |
| 9,616,701 B2 * | 4/2017 | Raab | B44C 3/02 |
| 2001/0031335 A1 * | 10/2001 | Hackett | B44C 3/08 428/157 |
| 2007/0031641 A1 | 2/2007 | Frisch et al. | |
| 2011/0039041 A1 * | 2/2011 | Williams | B44F 7/00 428/14 |
| 2012/0088074 A1 * | 4/2012 | Chuang | B44C 1/20 428/172 |
| 2013/0288024 A1 * | 10/2013 | Clauter | B42D 25/29 428/201 |
| 2017/0297257 A1 * | 10/2017 | Kackmann-Schneider | B44C 1/24 |
| 2018/0086134 A1 * | 3/2018 | Falck | B29C 66/742 |

(Continued)

FOREIGN PATENT DOCUMENTS

WO 2013192275 12/2013

*Primary Examiner* — Nahida Sultana
(74) *Attorney, Agent, or Firm* — Ulmer & Berne, LLP; Brian Turung; Eric Robbins

(57) ABSTRACT

The present disclosure is directed to articles configured as panels of artwork, methods of manufacturing the same, and methods of permanently transferring a coloring media to such articles. More particularly, the exemplary articles and methods for forming the same are configured to accept many types of coloring media on a surface thereof through use of a color-receptive layer.

28 Claims, 5 Drawing Sheets

(56) References Cited

U.S. PATENT DOCUMENTS

2019/0001743 A1\* 1/2019 Chiang .................. B44F 11/00
2019/0246817 A1\* 8/2019 Lam ........................ A47G 1/17
2020/0086674 A1\* 3/2020 Tashiro ................ G02B 5/0816
2020/0108655 A1\* 4/2020 Jurgens ..................... B44C 3/04

\* cited by examiner

METHOD OF APPLYING ARTWORK TO A 3D PLATE

The present disclosure claims priority on United States Provisional Application Ser. No. 62/721,372 filed Aug. 22, 2018, which is incorporated herein by reference.

The present disclosure relates to articles configured as panels of artwork, methods of manufacturing the same, and methods of permanently transferring a coloring media to such articles. More particularly, the panels of artwork disclosed herein are configured to accept many types of coloring media on surfaces thereof, including panels made from materials which do not ordinarily allow the coloring thereof. A layer or coating of material configured to receive, accept, transfer, etc., coloring media is utilized in the exemplary articles and methods disclosed herein.

BACKGROUND ON THE INVENTION

Many professional and amateur artists create artwork on various surfaces. Some of the more common surfaces are paper and canvas. Metal is another template used by professional and amateur artists. Metal templates have some advantages over paper and canvas in that the metal template is generally more rigid than paper and canvas, thus can be displayed without the use of a frame. Metal templates are also generally more durable than paper and canvas, thus are less likely to be damaged while the artist paints on the metal surface and while the artwork is displayed.

Although metal templates have some advantages over paper and canvas, only certain types of paints can be used on metal surfaces. Many types of paints do not properly adhere to the surface of the metal, thus have a tendency to smear or be easily rubbed off or removed from the metal surface. Also, many types of inks and paints have a tendency to bead or form a non-uniform coating on a metal surface. Such beading, non-uniformity of coating, and lack of adherence of the paints and ink to the metal surface are generally the result of the ink or paint being unable to penetrate the metal surface. As such, for many artists, painting on metal surfaces is undesirable.

In view of the prior art, there remains a need for a novel article and method for forming the same that includes a material which does not ordinarily allow the permanent or even temporary coloring thereof, but which has nevertheless been configured to receive, accept, transfer, etc., coloring media of various types.

BRIEF DESCRIPTION OF THE INVENTION

The present disclosure is directed to articles configured as panels of artwork, methods of manufacturing the same, and methods of permanently or near permanently transferring a coloring media to such articles. More particularly, the exemplary articles and methods for forming the same are configured to accept many types of coloring media on a surface thereof through use of a color-receptive layer. The particular coloring media used is non-limiting but may include any number of colored oil-based (i.e., permanent) markers, water-based (i.e., removable) markers, paints, inks, dyes, gels, and the like. The receptive coating creates a layer on the panel to which coloring media can transfer, including transfers that are both temporary and permanent. Thus, a method for permanently or near permanently coloring artwork and an article configured to permanently receive coloring media are disclosed.

In some non-limiting embodiments, the color-receptive layer is applied on top of a drawing or artwork layer that has been printed on the surface of the panel body (e.g., printed ink and/or paint layer, etc.). Moreover, the panel body can be manufactured to optionally include a series of raised and/or recessed relief images which provide additional detail and visual interest to the drawing/artwork layer. However, such a configuration is non-limiting.

The panel body for coloring disclosed herein can be made from any desired material without departing from the scope of the present disclosure. However, the material used to make the presently described panel body for coloring should be capable of receiving the color-receptive layer or layers such that the color-receptive layer can attach to the panel body material or otherwise provide the panel body with a matte-like surface finish. In some non-limiting embodiments, the material used to make the panel body for coloring can be metal. In other non-limiting embodiments, the panel body for coloring includes a panel body made from plastic, wood, composite material, ceramic, glass, etc.

In accordance with one non-limiting embodiment of the present disclosure, an article is disclosed that is configurable as a panel of artwork. The article generally includes a panel body having a front surface and a back surface. At least one color-receptive layer is applied to the front surface of the panel body and is configured to permit permanent transferring of a coloring media thereto. In some embodiments, the panel body is made from a metal material.

At least one support layer can further be included with the panel body. The at least one support layer is applied to the back surface of the panel body (metal coating, metal plate layer, polymer coating, etc.). In some embodiments, the at least one color-receptive layer and the at least one support layer can be made from the same or different materials. For example, both the at least one color-receptive layer and the at least one support layer can be made from a polymeric material.

In some non-limiting embodiments, the panel body further includes a) 3D indicia formed in the front and back surfaces of the panel body, and/or b) 2D indicia printed on the front surface of the panel body. The 2D indicia (when used) can correspond to at least a portion of the 3D indicia, and the at least one color-receptive layer covers both the 3D indicia and 2D indicia on the front surface of the panel body. In particular embodiments, the 3D and 2D indicia together at least partially form a 3D image covered by the at least one color-receptive layer so as to permit the permanent transferring of the color media to the 3D image.

In other non-limiting embodiments, the 2D indicia is formed from a selectively printed layer (e.g., ink layer, painted layer, etc.) formed on the front surface of the panel body. In such embodiments, the printed layer can further include a light-colored region and a dark-colored region, wherein at least the light-colored region is covered by the at least one color-receptive layer on the front surface of the panel body.

In accordance with another non-limiting embodiment of the present disclosure, a method of manufacturing an article configured as a panel of artwork is disclosed. The method generally includes the steps of providing a panel body having a front surface and a back surface and applying at least one color-receptive layer to the front surface. The at least one color-receptive layer is configured to permit permanent or near permanent transferring of a coloring media thereto. Generally, the color-receptive layer is formed of a material that 1) allows for greater penetration of the ink or paint into the surface of the color-receptive layer as compared to the surface of the material that is used to form the panel body, 2) provides greater bonding strength of the ink or paint into the surface of the color-receptive layer as compared to the surface of the material that is used to form the panel body, and/or 3) allows the ink or paint to form a more uniform coating on the surface of the color-receptive layer as compared to the surface of the material that is used to form the panel body. The at least one color-receptive layer is also optionally configured to maintain the 2D indicia on the panel body. When the 3D indicia is formed on the panel body, such formation of the 3D indicia can result in the damage or removal of the 2D indicia from the panel body. The coating of the color-receptive layer over the 2D indicia inhibits or prevents the 2D indicia from cracking, chipping off the panel body, peeling off the panel body, becoming scraped off the panel body, become scratched, becoming loose on the panel body, and/or otherwise being damaged during the forming of 3D indicia on the panel body.

In some non-limiting embodiments, the method also includes the applying of at least one support layer to the back surface of the panel body. In such embodiments, the panel body and at least one support layer applied thereto can be heated at a temperature of at least 90° C. (e.g., 90-250° and all values and ranges therebetween), and typically about 120-180° C. (e.g., 150-180° C.) for a period of about 0.1-120 minutes and all values and ranges therebetween (e.g., 15-20 minutes).

In other non-limiting embodiments, the method further includes the printing of 2D indicia on the front surface of the panel body and applying the at least one color-receptive layer to cover the 2D indicia on the front surface of the panel body. 3D indicia are formed in the front and back surfaces of the panel body such that the at least one color-receptive layer covers the 3D indicia on the front surface of the panel body. Moreover, an at least partial 3D image is formed with the 2D and 3D indicia. In particular non-limiting embodiments, the method can further include permanently transferring the coloring media to the at least one color-receptive layer covering the at least partial 3D image.

In accordance with yet another non-limiting embodiment of the present disclosure, a method of coloring an article configured as a panel of artwork is disclosed. The method generally includes the steps of: (a) providing a panel body, which panel body has a front surface and a back surface; (b) applying 2D indicia on the front surface of the panel body; (c) applying at least one color-receptive layer to the front surface such that the at least one color-receptive layer partially covers the 2D indicia on the front surface of the panel body; and (d) forming 3D indicia in the front and back surfaces of the panel body such that the at least one color-receptive layer at least partially covers the 3D indicia on the front surface of the panel body.

In accordance with yet another non-limiting embodiment of the present disclosure, a method of coloring an article configured as a panel of artwork is disclosed. The method generally includes the steps of: (a) providing a panel body, which panel body has a front surface and a back surface; (b) optionally applying one or more support layers on the back surface of the panel body; (c) optionally applying one or more support layers on the front surface of the panel body; (d) optionally heating (e.g., baking, etc.) the one or more support layers on the panel body; (e) applying 2D indicia on the front surface of the panel body; (f) optionally applying 2D indicia on the back surface of the panel body; (g) applying one or more color-receptive layers to the front surface of the panel body such that the one or more color-receptive layers at least partially covers the front surface of the panel body and optionally at least partially covers the 2D indicia on the front surface of the panel body; (h) optionally applying one or more color-receptive layers to the back surface of the panel body such that the one or more color-receptive layers at least partially covers the back surface of the panel body and optionally at least partially covers any optional 2D indicia on the back surface of the panel body; (i) heating (e.g., baking) the one or more color-receptive layers on the panel body; (j) forming 3D indicia on the front and back surfaces of the panel body; (k) optionally cutting the panel body into two or more panels; (l) optionally performing a finishing on the panel body; and (m) optionally forming a means for displaying on the panel body.

In accordance with yet another non-limiting embodiment of the present disclosure, a method of coloring an article configured as a panel of artwork is disclosed. The method generally includes the steps of: (a) providing a sheet of panel body material having a front surface and a back surface; (b) optionally applying one or more support layers on the back surface of the sheet of panel body material or at least partially or fully cover the back surface of the sheet of panel body material; (c) optionally applying one or more support layers on the front surface of the sheet of panel body material to at least partially or fully cover the front surface of the sheet of panel body material; (d) optionally heating (e.g., baking at 120-200° C. for 1-60 minutes) the one or more support layers on the sheet of panel body material; (e) selectively applying (e.g., printing, etc.) 2D indicia (e.g., base color layer, etc.) on the front surface of the sheet of panel body material; (f) optionally selectively applying (e.g., printing, etc.) 2D indicia (e.g., base color layer, etc.) on the back surface of the sheet of panel body material; (g) optionally heating (e.g., baking) the one or more layers of 2D indicia on the front and/or back surfaces of the panel body material (e.g., baking at 120-200° C. for 1-60 minutes); (h) applying one or more color-receptive layers to the front surface of the panel body material such that the one or more color-receptive layers at least partially or fully cover the front surface of the sheet of panel body material and optionally at least partially or fully covers the 2D indicia on the front surface of the sheet of panel body material, and wherein composition of the one or more color-receptive layers can be the same or different from the one or more support layers on the back surface of the sheet of panel body material; (i) optionally applying one or more color-receptive layers to the back surface of the panel body material such that the one or more color-receptive layers at least partially or fully cover the back surface of the sheet of panel body material and optionally at least partially or fully covers any optional 2D indicia on the back surface of the sheet of panel body material, and wherein composition of the one or more color-receptive layers can be the same or different from the one or more support layers on the back surface of the sheet of panel body material; (j) optionally heating (e.g., baking at 120-200° C. for 1-60 minutes) the one or more color-receptive layers on the sheet of panel body material; (k) optionally applying one or more secondary support layers to the front surface of the panel body material (e.g., glossy support layer, matte finish support layer, etc.) to at least partially or fully cover the 2D indicia on the front surface of the panel body material; (l) optionally applying one or more secondary support layers to the back surface of the panel body material (e.g., glossy support layer, matte finish support layer, etc.) to at least partially or fully cover the 2D indicia on the back surface of the panel body material; (m) optionally heating (e.g., baking at 120-200° C. for 1-60 minutes) the one or more secondary support layers on the panel body material; (n) forming 3D indicia in the front and back surfaces of the sheet of panel body material; (o) optionally cutting the sheet of panel body material into two or more panels; (p) optionally performing a finishing on the sheet of panel body material or two or more panels; (q) optionally forming a means for displaying on the sheet of panel body material or two or more panels, (r) optionally applying color-receptive layers to the front surface of the sheet of panel body material after the forming of the 3D indicia such that the one or more color-receptive layers at least partially cover the front surface of the sheet of panel body material and optionally at least partially covers the 2D indicia on the front surface of the sheet of panel body material, (s) optionally applying color-receptive layers to the back surface of the sheet of panel body material after the forming of the 3D indicia such that the one or more color-receptive layers at least partially cover the back surface of the sheet of panel body material and optionally at least partially covers the 2D indicia on the back surface of the sheet of panel body material, and (t) heating (e.g., baking at 120-200° C. for 1-60 minutes) the one or more support layers on the sheet of panel body material after the forming of the 3D indicia.

In a non-limiting embodiment, the panel body is formed of a metal material (e.g., tin, copper, aluminum, steel, stainless steel, bronze, etc.). The size of the front surface of the metal panel body is non-limiting. The thickness of the metal panel body is at least 0.2 mm (e.g., 0.2-10 mm and all values and ranges therebetween), and typically 0.3-1.8 mm.

In a non-limiting embodiment, the one or more support layers can be formed of a metal or polymer material. The one or more support layers can be applied to the surface of the panel body by electroplating, spray coating, dip coating, roller coating, thermal spray coating, anodized coating process, galvanize coating process, powder coating process, vapor deposition process, etc. The thickness of the one or more support layers is generally less than 1 mm (e.g., 0.0001-0.5 mm and all values and ranges therebetween). The color of the one or more support layers is non-limiting. In one non-limiting arrangement, the color of the one or more support layers is clear.

In a non-limiting embodiment, the one or more support layers are heated on the panel body. The heating temperature is generally at least 90° C. and typically no more than 250° C. and all values and ranges therebetween (e.g., 120-180° C.). The heating time is generally at least 0.5 minutes and typically less than 200 minutes and all values and ranges therebetween (e.g., 10-80 minutes). When the one or more support layers are or include a polymer material, the heating time and temperature is selected to ensure that the polymer material has fully set and/or cured on the panel body. After the panel body is heated, it is typically allowed to cool to ambient temperature (e.g., 15-38° C.) prior to further processing the panel body; however, this is not required.

In a non-limiting embodiment, the forming of the 2D indicia can be accomplished by selectively printing one or more colored layers (e.g., ink layers, paint layers, etc.) on the front surface of the panel body and optionally on the back surface of the panel body. The 2D indicia can be a single color or multiple colors. In one non-limiting aspect of the invention, the 2D indicia is formed by the use of one or more dark colors and one or more light colors so as to form one or more light-colored regions and one or more dark-colored regions on the front surface and optionally on the back surface of the panel body. In one non-limiting arrangement, the one or more dark-colored regions are used to indicate borders or regions that are not to be colored by a user, and the one or more light-colored regions are used to indicate regions wherein a user is to apply color to the panel body.

In a non-limiting embodiment, the one or more color-receptive layers are formed of a material wherein a permanent marker can be applied to the surface of the color-receptive layer and the ink from the permanent makers will permanently or nearly permanently bond to the color-receptive layer such that ink from the permanent marker forms a stronger and more permanent bond with the surface of the color-receptive layer when compared to the ink being applied directly on the surface of the panel body. For panel bodies formed of a metal material, ink from a permanent marker will typically smear or easily rub off after the ink has dried. The material used to form the one or more color-receptive layers has a texture, coating composition, and/or coating structure that enables the ink from the permanent marker to form a strong and more permanent bond with the surface of the color-receptive layer than compared to the same ink being applied directly on the surface of the panel body such as a metal panel body. The polymer material used to form the one or more color-receptive layers can be the same material or a different material from the material used to form the one or more support layers. The one or more color-receptive layer can be applied to the surface of the panel body by spray coating, dip coating, roller coating, etc. The thickness of the one or more color-receptive layers is generally less than 1 mm (e.g., 0.0001-0.5 mm and all values and ranges therebetween). The color of the one or more color-receptive layers is non-limiting. In one non-limiting arrangement, the color of the one or more color-receptive layers is clear. The surface of the one or more color-receptive layers can be glossy, matte, smooth, rough, etc. In another non-limiting aspect of the invention, the one or more color-receptive layers are applied to the front surface to at least partially cover the light-colored region of the 2D indicia. In another non-limiting aspect of the invention, the one or more color-receptive layers are applied to the front surface to fully cover the light-colored region of the 2D indicia. In one non-limiting embodiment, the one or more color-receptive layers are applied to the front surface to partially cover at least 50% (e.g., 50-100% and all values and ranges therebetween) of the light-colored region of the 2D indicia. In another non-limiting embodiment, the one or more color-receptive layers are applied to the front surface to partially cover at least 75% of the light-colored region of the 2D indicia. In another embodiment, the one or more color-receptive layers are applied to the front surface to partially cover at least 85% of the light-colored region of the 2D indicia. In another non-limiting aspect of the invention, the one or more color-receptive layers are applied to the front surface to at least partially cover the dark-colored region of the 2D indicia. In another non-limiting aspect of the invention, the one or more color-receptive layers are applied to the front surface to fully cover the dark-colored region of the 2D indicia. In another non-limiting aspect of the invention, the one or more color-receptive layers are applied to the front surface to fully cover the front surface of the panel body.

In a non-limiting embodiment, the one or more color-receptive layers are heated on the panel body. The heating temperature is generally at least 90° C. and typically no more than 250° C. and all values and ranges therebetween (e.g., 120-180° C.). The heating time is generally at least 0.5 minutes and typically less than 200 minutes and all values and ranges therebetween (e.g., 10-80 minutes). When the one or more color-receptive layers are or include a polymer material, the heating time and temperature is selected to ensure that the polymer material has fully set and/or cured on the panel body. After the panel body is heated, it is typically allowed to cool to ambient temperature (e.g., 15-38° C.) prior to further processing the panel body; however, this is not required.

In a non-limiting embodiment, the method for forming 3D indicia in the front and back surfaces of the panel body can be formed by a heated mold, stamping, embossing, etc. The configuration of the 3D indicia is non-limiting. In one non-limiting aspect, the one or more color-receptive layers at least partially cover the 3D indicia on the front surface of the panel body. In another non-limiting aspect, the one or more color-receptive layers fully cover the 3D indicia on the front surface of the panel body. In another non-limiting aspect, the one or more color-receptive layers at least partially cover the front surface of the panel body that is absent the 3D indicia. In another non-limiting aspect, the one or more color-receptive layers fully cover the front surface of the panel body that is absent the 3D indicia. In one non-limiting aspect, the one or more color-receptive layers optionally at least partially cover the 3D indicia on the back surface of the panel body. In another non-limiting aspect, the one or more color-receptive layers optionally fully cover the 3D indicia on the back surface of the panel body. In another non-limiting aspect, the one or more color-receptive layers optionally at least partially cover the back surface of the panel body that is absent the 3D indicia. In another non-limiting aspect, the one or more color-receptive layers optionally fully cover the back surface of the panel body that is absent the 3D indicia. The maximum height of the 3D indicia measured from the top planar surface of the panel body is no more than 10 times the thickness of the panel body, and typically about 1-5 times the thickness of the panel body.

In a non-limiting embodiment, the method for optionally cutting the panel body into two or more panels can be performed by stamp cutting, laser cutting, mechanical cutting, etc.

In a non-limiting embodiment, the method for optionally performing a finishing on the panel body includes deburring the panel body, rolling edges of the panel body, rounding corners of the panel body, smoothing edges of the panel body, etc.

In a non-limiting embodiment, the method for optionally forming a means for displaying on the panel body includes punching one or more hanging holes in the panel body, applying a hook to the panel body, applying a hanging wire/cord to the panel body, etc.

The method can further include permanently transferring or applying coloring media to the one or more color-receptive layers on the front surface and optionally on the back surface of the panel body. In one non-limiting aspect of the invention, the coloring media is primarily transferred or applied to the one or more color-receptive layers that overlay the light-colored region of the 2D indicia on the panel body. The method can further include avoiding the transferring or applying of the coloring media to the one or more color-receptive layers that overlie the dark-colored region of the 2D indicia of the panel body.

In accordance with some non-limiting aspects of the embodiments disclosed herein, the article in the form of a panel body for coloring includes a panel body that can be formed from a sheet of material which is cut into a plurality of panel bodies.

One non-limiting object of the disclosure is the provision of an article and method of manufacturing the same, in which said article can be used to accept many types of coloring media on a surface thereof through use of a color-receptive layer.

Another non-limiting object of the disclosure is the provision of an article that includes a receptive coating that creates a layer on the panel body of the panel body for coloring on which coloring media can applied and/or transferred.

Another non-limiting object of the disclosure is the provision of an article that includes a color-receptive layer that is applied on top of a drawing or artwork layer that has been printed on the surface of the panel body of the article.

Another non-limiting object of the disclosure is the provision of an article that includes a series of raised and/or recessed relief images which provide additional detail and visual interest to the drawing/artwork layer on the surface of the panel body of the article.

Another non-limiting object of the disclosure is the provision of an article that includes a panel body that is formed of metal, plastic, wood, composite material, ceramic, glass, etc.

Another non-limiting object of the disclosure is the provision of an article that includes a panel body that is formed of a single piece of material.

Another non-limiting object of the disclosure is the provision of an article that includes a panel body that includes one or more support layers that are applied to the front and/or back surface of the panel body.

Another non-limiting object of the disclosure is the provision of an article that includes a panel body that includes one or more support layers that are fully or partially formed of a metal and/or polymer.

Another non-limiting object of the disclosure is the provision of an article that includes a panel body that includes one or more color-receptive layers that are applied to the front and/or back surface of the panel body.

Another non-limiting object of the disclosure is the provision of an article that includes a panel body that includes one or more color-receptive layers that are fully or partially formed of a polymer.

Another non-limiting object of the disclosure is the provision of an article that includes a panel body that includes one or more support layers that are applied to the back surface of the panel body, and one or more color-receptive layers that are applied to the front surface of the panel body.

Another non-limiting object of the disclosure is the provision of an article that includes a panel body that includes one or more color-receptive layers that are formed of a material that allows for greater penetration of the ink or paint onto the surface of the color-receptive layer as compared to the surface of the material that is used to form the panel body.

Another non-limiting object of the disclosure is the provision of an article that includes a panel body that includes one or more color-receptive layers that are formed of a material that allows for greater bonding strength of the ink or paint onto the surface of the color-receptive layer as compared to the surface of the material that is used to form the panel body.

Another non-limiting object of the disclosure is the provision of an article that includes a panel body that includes one or more color-receptive layers that are formed of a material that allows for the ink or paint to form a more uniform coating on the surface of the color-receptive layer as compared to the surface of the material that is used to form the panel body.

Another non-limiting object of the disclosure is the provision of an article that includes a panel body that includes one or more color-receptive layers that are formed of a material that has a greater porosity or is more porous than the surface of the material that is used to form the panel body.

Another non-limiting object of the disclosure is the provision of an article that includes a) 3D indicia formed in the front and/or back surfaces of the panel body, and/or b) 2D indicia printed, painted, and/or otherwise applied on the front and/or back surface of the panel body.

Another non-limiting object of the disclosure is the provision of an article that includes 2D indicia that corresponds to at least a portion of the 3D indicia that is located on the front and/or back of the panel body.

Another non-limiting object of the disclosure is the provision of an article that includes one or more color-receptive layers that partially or fully cover the 3D indicia and/or the 2D indicia on the front and/or back surface of the panel body.

Another non-limiting object of the disclosure is the provision of an article that includes 3D and 2D indicia which together at least partially form a 3D image, and wherein the 3D image is partially or fully covered by the one or more color-receptive layers so as to permit the permanent or near permanent applying or transferring of a color media onto the 3D image.

Another non-limiting object of the disclosure is the provision of an article wherein the 2D indicia is formed from a selectively printed ink and/or paint layer formed on the front and/or back surface of the panel body.

Another non-limiting object of the disclosure is the provision of an article wherein the 2D indicia is formed from a selectively printed ink and/or paint layer formed on the front and/or back surface of the panel body, wherein the 2D indicia includes one or more light-colored regions and one or more dark-colored regions.

Another non-limiting object of the disclosure is the provision of an article wherein the 2D indicia is formed from one or more layers of a selectively printed or colored layer (e.g., printed ink and/or paint layer) formed on the front and/or back surface of the panel body, wherein the 2D indicia includes one or more light-colored regions and one or more dark-colored regions, and wherein the one or more dark-colored regions (e.g., dark colored regions [e.g., Pantone® Black, Black 2, Black 2 2X, Black 3, Black 3 2X, Black 4, Black 4 2X, Black 5, Black 5 2X, Black 6, Black 6 2X, Black 7, Black 7 2X, PMS 412, PMS 419, PMS 426, PMS 433, PMS 433 2X, PMS 532, PMS 539, PMS 5395, PMS 546, PMS 5463, PMS 627, PMS 654, PMS 655]) are not intended to have color applied or transferred by a user to such one or more dark-colored regions when the user is coloring the article, and wherein the one or more light-colored regions (e.g., non-dark colored regions, white-colored region, beige-colored region, off-white colored region, etc.) are intended to have color applied or transferred by a user to such one or more light-colored regions when the user is coloring the article. The dark-colored regions have a color such that if a user applies a colored marker (e.g., permanent ink marker, water-based ink marker, etc.) to the dark-colored region, it will be very different, if not impossible, for the user using his/her naked eye to see that any color has been applied to the dark-colored region.

Another non-limiting object of the disclosure is the provision of an article wherein the one or more color-receptive layers are applied to the front surface to fully cover the light-colored region of the 2D indicia.

Another non-limiting object of the disclosure is the provision of an article wherein the one or more color-receptive layers are applied to the front surface to at least partially cover at least 50% (e.g., 50-100% and all values and ranges therebetween) of the light-colored region of the 2D indicia.

Another non-limiting object of the disclosure is the provision of an article wherein the panel body is formed of a metal material (e.g., tin, copper, aluminum, steel, stainless steel, bronze, etc.).

Another non-limiting object of the disclosure is the provision of an article wherein the panel body is formed of a metal material wherein the thickness of the metal sheet is at least 0.2 mm, and typically 0.3-1.8 mm.

Another non-limiting object of the disclosure is the provision of an article wherein the panel body has a thickness of at least 0.2 mm, and typically 0.3-5 mm.

Another non-limiting object of the disclosure is the provision of an article wherein the panel body has a thickness that is generally greater than the thickness of the support layer.

Another non-limiting object of the disclosure is the provision of an article wherein the panel body has a thickness that is generally greater than the thickness of the color layer.

Another non-limiting object of the disclosure is the provision of an article wherein the panel body has a thickness that is generally greater than the thickness of the color-receptive layer.

Another non-limiting object of the disclosure is the provision of an article wherein the panel body has a thickness that is generally greater than the combined thickness of the support layer, color layer, and color-receptive layer.

Another non-limiting object of the disclosure is the provision of an article wherein the one or more support layers that are applied to the front and/or back surface of the panel body are formed of a metal or polymer material.

Another non-limiting object of the disclosure is the provision of an article wherein the one or more support layers that are applied to the front and/or back surface of the panel body are applied to the surface of the panel body by electroplating, spray coating, dip coating, roller coating, thermal spray coating, anodized coating process, galvanize coating process, powder coating process, vapor deposition process, etc.

Another non-limiting object of the disclosure is the provision of an article wherein the thickness of the one or more support layers that are applied to the front and/or back surface of the panel body is generally less than 1 mm (e.g., 0.0001-0.5 mm and all values and ranges therebetween).

Another non-limiting object of the disclosure is the provision of an article wherein the one or more support layers that are applied to the front and/or back surface of the panel body are heated on the panel body at a heating temperature of at least 90° C. and typically no more than 250° C. for at least 0.5 minutes and typically less than 200 minutes.

Another non-limiting object of the disclosure is the provision of an article wherein the one or more color-receptive layers that are applied to the front and/or back surface of the panel body has a texture, coating composition, and/or coating structure that enables a permanent and/or non-permanent marker to form a strong and more permanent bond with the surface of the color-receptive layer than compared to the same ink being applied directly on the surface of the panel body.

Another non-limiting object of the disclosure is the provision of an article wherein the one or more color-receptive layers that are applied to the front and/or back surface of the panel body is a polymer material.

Another non-limiting object of the disclosure is the provision of an article wherein the one or more color-receptive layers that are applied to the front and/or back surface of the panel body is applied to the surface of the panel body by spray coating, dip coating, roller coating, etc.

Another non-limiting object of the disclosure is the provision of an article wherein the one or more color-receptive layers that are applied to the front and/or back surface of the panel body has a thickness of generally less than 1 mm (e.g., 0.0001-0.5 mm and all values and ranges therebetween).

Another non-limiting object of the disclosure is the provision of an article wherein the one or more color-receptive layers that are applied to the front and/or back surface of the panel body are heated at a heating temperature of generally at least 90° C. and typically no more than 250° C. (e.g., 120-180° C.) and a heating time of at least 0.5 minutes and typically less than 200 minutes (e.g., 10-80 minutes).

Another non-limiting object of the disclosure is the provision of an article wherein the panel body is processed to form 3D indicia in the front and back surfaces of the panel body.

Another non-limiting object of the disclosure is the provision of an article wherein the panel body is processed to form 3D indicia in the front and back surfaces of the panel body over at least 5% of the surface area of the front surface and typically less than 90% of the surface area of the front surface (e.g., 5-90% and all values and ranges therebetween), and typically at least about 10% of the surface area of the front surface, and more typically at least 15% of the surface area of the front surface.

Another non-limiting object of the disclosure is the provision of an article wherein the panel body is processed to form 3D indicia in the front and back surfaces of the panel body by a) a heat molding process when the panel body is formed of plastic or metal, b) a stamping process when the panel body is formed of metal, or c) an embossing process when the panel body is formed of metal.

Another non-limiting object of the disclosure is the provision of an article wherein the sheet of panel body material is cut into two or more panel bodies.

Another non-limiting object of the disclosure is the provision of an article wherein the panel body is subject to a finishing process wherein a) the edges of the panel body are subject to deburring to remove sharp or rough sections, b) rolling the edges of the panel bodies, c) rounding the corners of the panel bodies, and/or d) smoothing the edges of the panel body.

Another non-limiting object of the disclosure is the provision of an article wherein there is provided a method of manufacturing an article configured as a panel of artwork.

Another non-limiting object of the disclosure is the provision of an article wherein there is provided a method of manufacturing an article configured as a panel of artwork that includes the steps of providing a panel body having a front surface and a back surface and applying one or more color-receptive layers to the front and/or back surface, and wherein the one or more color-receptive layers are configured to permit permanent or near permanent applying or transferring of a coloring media thereto.

Another non-limiting object of the disclosure is the provision of an article wherein there is provided a method of manufacturing an article configured as a panel of artwork that includes the steps of (a) providing a sheet of panel body material having a front surface and a back surface; (b) applying 2D indicia on the front surface of the sheet of panel body material; (c) applying at least one color-receptive layer to the front surface such that the at least one color-receptive layer partially covers the 2D indicia on the front surface of the sheet of panel body material; and (d) forming 3D indicia in the front and back surfaces of the sheet of panel body material such that the at least one color-receptive layer at least partially covers the 3D indicia on the front surface of the sheet of panel body material.

Another non-limiting object of the disclosure is the provision of an article wherein there is provided a method of manufacturing an article configured as a panel of artwork that includes the steps of (a) providing a sheet of panel body material having a front surface and a back surface; (b) optionally applying one or more support layers on the back surface of the sheet of panel body material; (c) optionally applying one or more support layers on the front surface of the sheet of panel body material; (d) optionally heating (e.g., baking) the one or more support layers on the sheet of panel body material; (e) applying 2D indicia on the front surface of the sheet of panel body material; (f) optionally applying 2D indicia on the back surface of the sheet of panel body material; (g) applying one or more color-receptive layers to the front surface of the sheet of panel body material such that the one or more color-receptive layers at least partially cover the front surface of the sheet of panel body material and optionally at least partially covers the 2D indicia on the front surface of the sheet of panel body material; (h) optionally applying one or more color-receptive layers to the back surface of the sheet of panel body material such that the one or more color-receptive layers at least partially cover the back surface of the sheet of panel body material and optionally at least partially covers any optional 2D indicia on the back surface of the sheet of panel body material; (i) heating (e.g., baking) the one or more color-receptive layers on the sheet of panel body material; (j) forming 3D indicia in the front and back surfaces of the sheet of panel body material; (k) optionally cutting the sheet of panel body material into two or more panels; (l) optionally performing a finishing on the sheet of panel body material or two or more panels; and (m) optionally forming a means for displaying on the sheet of panel body material or two or more panels.

Another non-limiting object of the disclosure is the provision of an article wherein there is provided a method of manufacturing an article configured as a panel of artwork that includes the steps of (a) providing a sheet of panel body material having a front surface and a back surface; (b) optionally applying one or more support layers on the back surface of the sheet of panel body material or at least partially or fully cover the back surface of the sheet of panel body material; (c) optionally applying one or more support layers on the front surface of the sheet of panel body material to at least partially or fully cover the front surface of the sheet of panel body material; (d) optionally heating (e.g., baking at 120-200° C. for 1-60 minutes) the one or more support layers on the sheet of panel body material; (e) selectively applying (e.g., printing, etc.) 2D indicia (e.g., base color layer, etc.) on the front surface of the sheet of panel body material; (f) optionally selectively applying (e.g., printing, etc.) 2D indicia (e.g., base color layer, etc.) on the back surface of the sheet of panel body material; (g) optionally heating (e.g., baking) the one or more layers of 2D indicia on the front and/or back surfaces of the panel body material (e.g., baking at 120-200° C. for 1-60 minutes); (h) applying one or more color-receptive layers to the front surface of the panel body material such that the one or more color-receptive layers at least partially or fully cover the front surface of the sheet of panel body material and optionally at least partially or fully covers the 2D indicia on the front surface of the sheet of panel body material, and wherein composition of the one or more color-receptive layers can be the same or different from the one or more support layers on the back surface of the sheet of panel body material; (i) optionally applying one or more color-receptive layers to the back surface of the panel body material such that the one or more color-receptive layers at least partially or fully cover the back surface of the sheet of panel body material and optionally at least partially or fully covers any optional 2D indicia on the back surface of the sheet of panel body material, and wherein composition of the one or more color-receptive layers can be the same or different from the one or more support layers on the back surface of the sheet of panel body material; (j) optionally heating (e.g., baking at 120-200° C. for 1-60 minutes) the one or more color-receptive layers on the sheet of panel body material; (k) optionally applying one or more secondary support layers to the front surface of the panel body material (e.g., glossy support layer, matte finish support layer, etc.) to at least partially or fully cover the 2D indicia on the front surface of the panel body material; (l) optionally applying one or more secondary support layers to the back surface of the panel body material (e.g., glossy support layer, matte finish support layer, etc.) to at least partially or fully cover the 2D indicia on the back surface of the panel body material; (m) optionally heating (e.g., baking at 120-200° C. for 1-60 minutes) the one or more secondary support layers on the panel body material; (n) forming 3D indicia in the front and back surfaces of the sheet of panel body material; (o) optionally cutting the sheet of panel body material into two or more panels; (p) optionally performing a finishing on the sheet of panel body material or two or more panels; (q) optionally forming a means for displaying on the sheet of panel body material or two or more panels, (r) optionally applying color-receptive layers to the front surface of the sheet of panel body material after the forming of the 3D indicia such that the one or more color-receptive layers at least partially cover the front surface of the sheet of panel body material and optionally at least partially covers the 2D indicia on the front surface of the sheet of panel body material, (s) optionally applying color-receptive layers to the back surface of the sheet of panel body material after the forming of the 3D indicia such that the one or more color-receptive layers at least partially cover the back surface of the sheet of panel body material and optionally at least partially covers the 2D indicia on the back surface of the sheet of panel body material, and (t) heating (e.g., baking at 120-200° C. for 1-60 minutes) the one or more support layers on the sheet of panel body material after the forming of the 3D indicia.

Another non-limiting object of the disclosure is the provision of an article wherein there is provided a method of manufacturing an article configured as a panel of artwork that includes the steps of applying of one or more support layers to the front and/or back surface of the panel body.

Another non-limiting object of the disclosure is the provision of an article wherein there is provided a method of manufacturing an article configured as a panel of artwork that includes the steps of applying one or more support layers to the front and/or back surface of the panel body, and wherein the one or more support layers are heated at a temperature of at least 90° C. (e.g., 90-250° and all values and ranges therebetween) for a period of about 0.1-120 minutes (and all values and ranges therebetween).

Another non-limiting object of the disclosure is the provision of an article wherein there is provided a method of forming a means for displaying on the panel body.

Another non-limiting object of the disclosure is the provision of an article wherein there is provided a method of forming a means for displaying on the panel body wherein the means includes punching one or more hanging holes in the panel body, applying a hook to the panel body, and applying a hanging wire/cord to the panel body.

Another non-limiting object of the disclosure is the provision of an article wherein there is provided a method of transferring or applying coloring media to the one or more color-receptive layers on the front surface and/or back surface of the panel body.

Another non-limiting object of the disclosure is the provision of an article wherein there is provided a method of transferring or applying coloring media to the one or more color-receptive layers on the front surface and/or back surface of the panel body wherein the coloring media is primarily transferred or applied to the one or more color-receptive layers that overlay the light-colored region of the 2D indicia on the panel body.

These and other objects and advantages will become apparent from the discussion of the distinction between the invention and the prior art and when considering the preferred embodiment shown in the accompanying drawings.

BRIEF DESCRIPTION OF THE DRAWINGS

Reference may now be made to the drawings, which illustrate various embodiments that the invention may take in physical form and in certain parts and arrangements of parts wherein.

DETAILED DESCRIPTION

Figure 1:
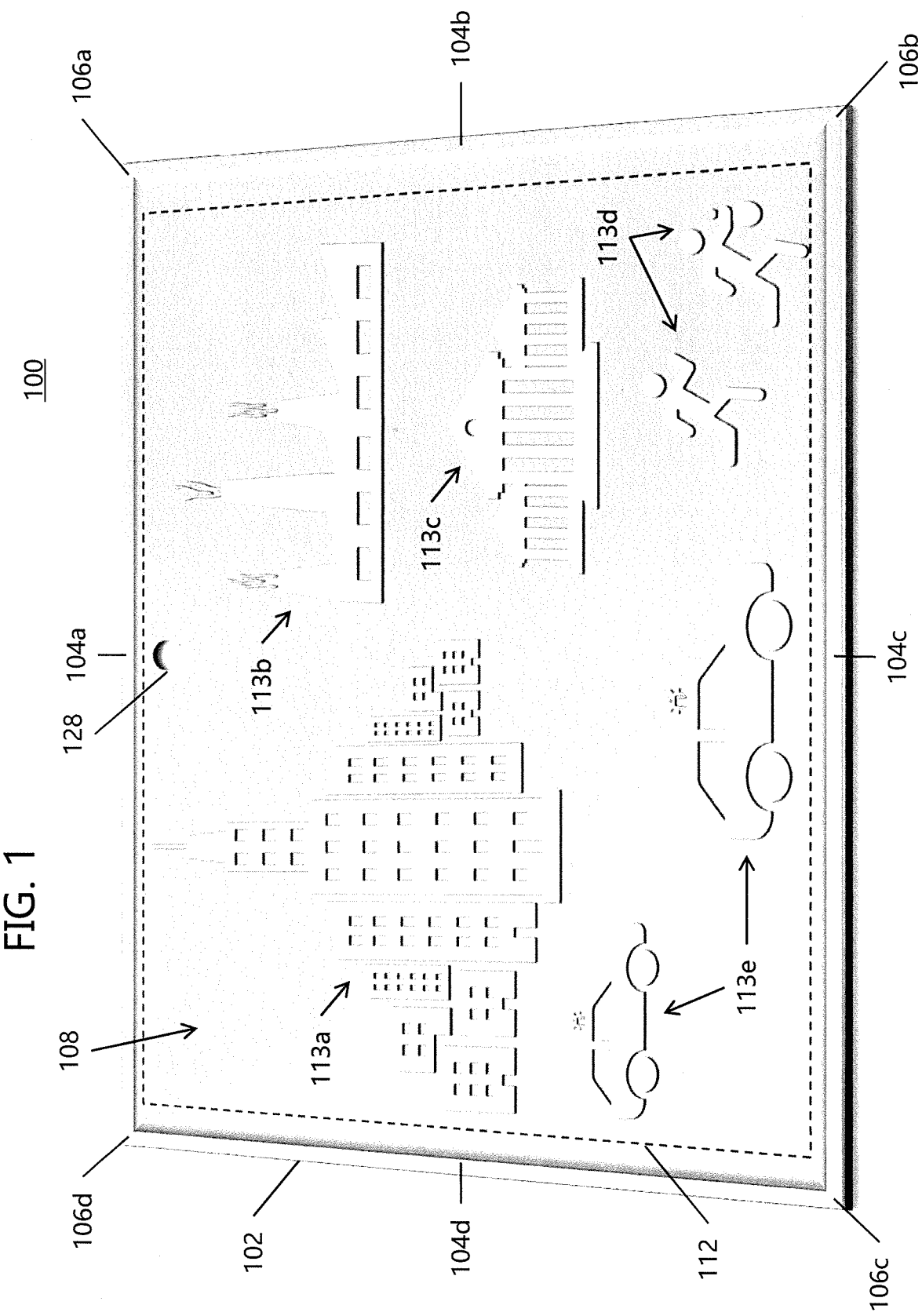
FIG. 1 is an illustration according to one non-limiting embodiment of the present disclosure showing a perspective top view of a front surface of an article configured as a panel of artwork which can permanently receive the transfer of various types of coloring media.

A more complete understanding of the articles/devices, processes and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

Percentages of elements should be assumed to be percent by weight of the stated element, unless expressly stated otherwise.

Figure 2:
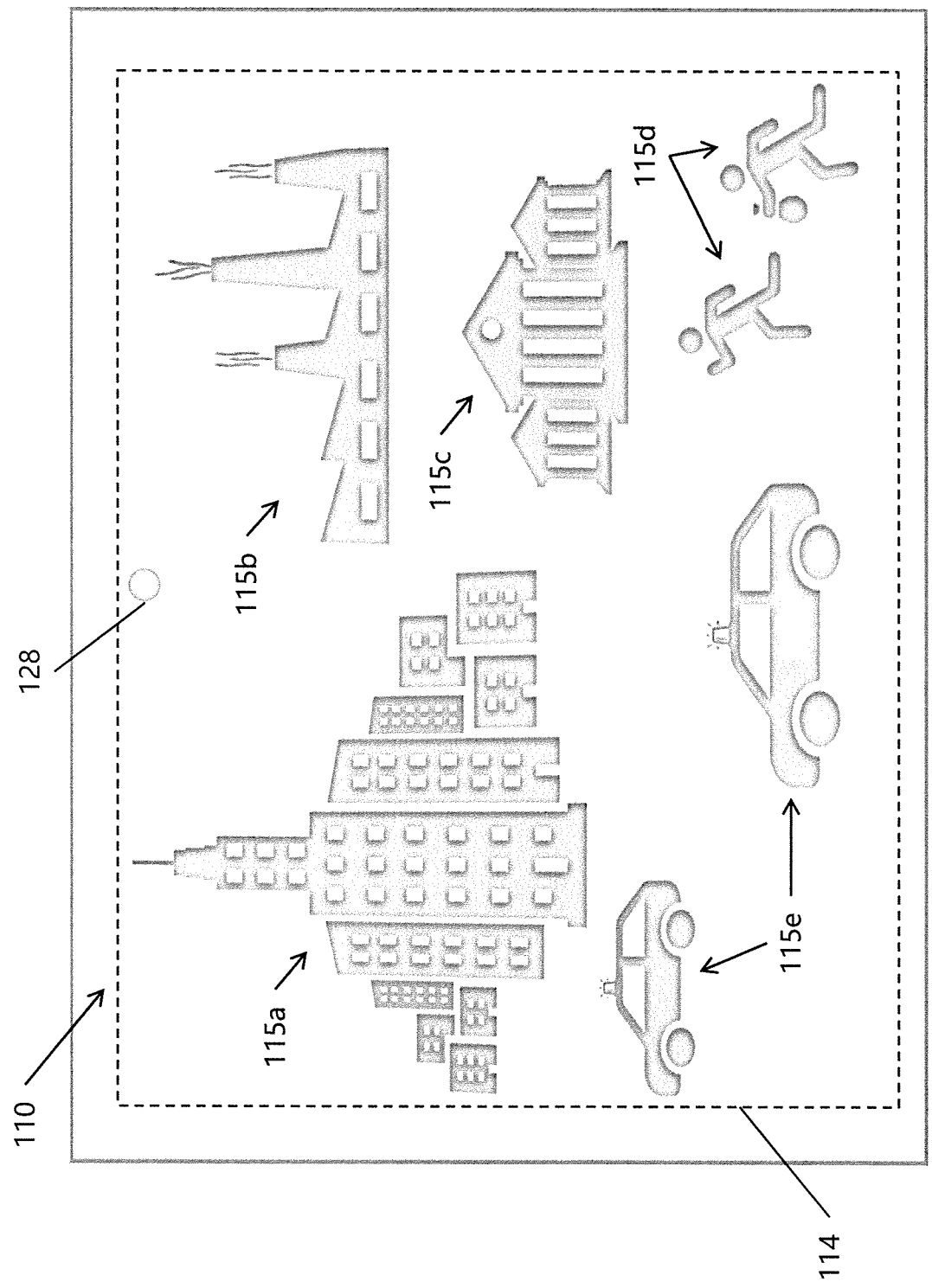
FIG. 2 is an image of the article shown in FIG. 1 which illustrates a bottom perspective view of a back surface of the article.
Figure 3:
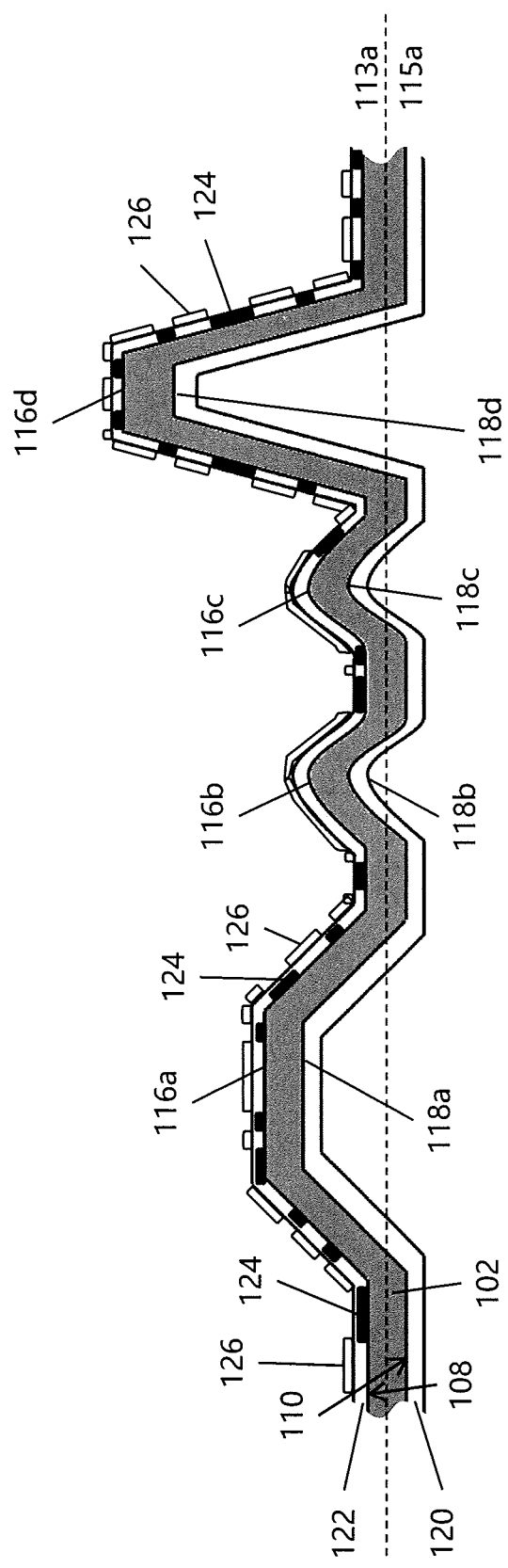
FIG. 3 is a cross-sectional sideview of a portion of the article illustrated in FIGS. 1 and 2 and which shows a close-up detail of one or more raised and corresponding recessed relief portions which make up part of a 3D indicia formed on the front surface of the panel.

Referring now to the drawings, wherein the showings are for the purpose of illustrating non-limiting embodiments of the disclosure only and not for the purpose of limiting the same, FIGS. 1-3 illustrate an article in the form of a panel body for coloring 100 created by the methods described herein. More particularly, the article 100 includes a semi-complete panel body 102 of artwork configured to accept many types of coloring media on a surface thereof through use of a color-receptive layer. The particular coloring media used is non-limiting but generally includes colored oil-based markers and water-based markers, and inks. The color-receptive layer creates a layer on the panel body to which coloring media allows for a) greater penetration of the coloring media onto the surface of the color-receptive layer as compared to the surface of the material that is used to form the panel body, b) greater bonding strength of the coloring media to the surface of the color-receptive layer as compared to the surface of the material that is used to form the panel body, c) a more uniform coating of the coloring media forming on the surface of the color-receptive layer as compared to the surface of the material that is used to form the panel body. Generally, the surface of the color-receptive layer is formed of a material that has a greater porosity or is more porous than the surface of the material that is used to form the panel body. Thus, a method for permanently coloring artwork and an article configured to permanently receive coloring media are disclosed. In some non-limiting embodiments, the color-receptive layer is applied on top of a drawing or artwork layer that has been pre-printed on the surface of the panel body. Moreover, the panel body can be manufactured to include a series of raised and/or recessed relief images which provide additional detail and visual interest to the drawing/artwork layer.

The article 100 includes a panel body 102 which is generally plate-like and rectangular in shape; however, the panel body can be formed to have any body shape without departing from the scope of the present disclosure. In addition, while the specific dimensions are non-limiting, in some embodiments the panel body 102 can be sized to have dimensions that correspond to commonly used art media, such as photographs, posters, canvases, etc. For example, a "small" panel body can have a size of about 5 inches by about 8 inches, while a "large" panel body can have a size of about 12.5 inches by about 16 inches. However, such configurations are non-limiting.

A large sheet of material can be used to form a plurality of panels; however, this is not required. The thickness and material of the panel body 102 is generally such that the panel body can be cut using standard scissors. However, sheets or panels of greater thickness are also contemplated which could require other tools for cutting, such as sheers, knives, saws, lasers, water jets, and the like. Moreover, the particular material of the sheet of panel body material is non-limiting and may include metals and plastics. In some non-limiting embodiments, the panel body 102 is made from a metal such as tin or tin foil. In other non-limiting embodiments, the panel body 102 is made from a plastic material.

Additional features of the panel body 102 will now be discussed which are generally formed by methods described in greater detail below. As illustrated in FIG. 1, the panel body 102 has four sides 104a, 104b, 104c, 104d and four corners 106a, 106b, 106c, 106d which define an outer perimeter of the panel. As can be appreciated, the panel body can have an oval or circular shape or some other polygonal or other non-polygonal shape. A finishing step is applied to each of the four sides 104a, 104b, 104c, 104d and four corners 106a, 106b, 106c, 106d of the panel body 102. The finishing step is used to improve the usability, ergonomics, and safety of the panel body 102, and such finishing step can include, but is not limited to, a deburring and/or a rolling process which eliminates and/or reduces sharp edges formed on sides 104a, 104b, 104c, 104d and corners 106a, 106b, 106c, 106d. As illustrated in FIGS. 1 and 2, side 104a is illustrated as a top side, side 104c is illustrated as a bottom side, and sides 104b/104d are illustrated as right and left sides, respectively. However, such a configuration is non-limiting.

The panel body 102 also includes a front surface 108 and a back surface 110, both of which are generally planar in shape. Generally, the panel body has a uniform thickness and has a flat or planar front and back surface.

As illustrated in FIGS. 1-2, the front surface 108 has a design area 112 which includes one or more preformed and/or preprinted designs, words and lettering, patterns, artworks, and/or drawings (hereinafter "indicia") 113a-113e. The indicia 113a-113e on the front surface design area 112 is generally comprised of one or more raised relief portions, all of which can have the same or different height. In other words, the front surface design area 112 generally includes embossed indicia 113a-113e which are raised against the flat planar front surface 108; however, this is not required. The back surface 110 forms a design area 114 which includes one or more indicia 115a-115e, each of which are comprised of one or more recessed relief portions which correspond to a reverse and/or flipped image of raised indicia 113a-113e; however, this is not required. In other words, the back surface design area 114 includes debossed indicia 115a-115e which are generally sunken into the flat planar back surface 110. However, such a configuration is non-limiting and it should be understood that, depending on the particular indicia included in design areas 112 and 114, some of the debossed/sunken-in indicia 115a-115e may include portions that could be considered as raised or protruding from the back surface 110.

The panel body 102 can further include one or more display features adapted to permit the easy viewing of a finished panel artwork. For example, the one or more display features include, but are not limited to, a through-hole 128 drilled in the panel body 102 and extending between the front surface 108 and back surface 110 thereof. As another non-limiting example, the one or more display features could include a means for hanging the panel (not shown) that is attached adjacent an outer perimeter edge of the panel body 102 on the back surface 110 thereof.

The particular number, type, and/or size of the indicia which make up the design areas 112, 114 is non-limiting. However, a portion or all of the one or more indicia 113a-113e on the design area 112 of the front surface 108 are configured to accept one or more types of coloring media as described in further detail below. In contrast, each of the corresponding reversed/flipped and sunken-in indicia 115a-115e on the design area 114 of the back surface 114 is typically not configured to accept coloring media; however, this is not required.

With particular reference to FIG. 3, an enlarged cross-sectional sideview of the panel body 102 provides additional close-up details for portions of the embossed and debossed indicia described above. More particularly, exemplary raised portions 116a-116d of indicia 113a and recessed portions 118a-118d of corresponding indicia 115a can be seen. It should be understood that the raised and recessed segments shown in FIG. 3 are for illustration purposes only and do not necessarily correspond to actual embossed and debossed portions which would make up indicia 113a/115a. At least one protective or support layer 120 is coated on the back surface 110 of the panel body 102, and at least one color-receptive layer 122 that is receptive to a coloring media is coated on the front surface 108. An optional printed or colored layer 124 (e.g., ink layer, paint layer, etc.) is selectively printed on one or more areas of the front surface 108 within design area 112. A layer of coloring media 126 is applied on top of the at least one color-receptive layer 122.

As used herein, the terms 'selectively printed' is defined as the color layer 124 is applied in such a manner that a coloring book-like effect is provided to the front surface 108 of the panel body 102, including at least some segments of the raised portions which make up the one or more indicia (such as such as raised portions 116a-116d of indicia 113a). The color layer 124 can similarly be selectively printed to provide the coloring book-like effect to other portions of the design area 112, such as flat portions (i.e., non-embossed portions) of the front surface 108. In this regard, the color layer 124 is typically provided with two or more color components, generally a light-colored region (such as a white, off-white or beige region) and a dark-colored region (such as a black or dark grey region). The light- and dark-colored regions of the color layer 124 establish guidelines useful for indicating which portions of the design area 112 should receive coloring media (i.e., the light-colored regions of the color layer) and which should not receive coloring media (i.e., the dark-colored regions of the color layer).

In non-limiting configurations which include the printed or color layer 124, the at least one color-receptive layer 122 can be deposited on top of the printed or colored layer, thereby covering both the printed or color layer and the front surface 108 of the panel body 102. It is intended that the layer of coloring media 126, that is applied by a user, be applied to the portions of the at least one color-receptive layer 122 that are above the light-colored regions of color layer 124. This is because the colors in media layer 126 can be seen more easily when applied to portions of the color-receptive layer 122 located above these light-colored regions of printed or colored layer 124, as compared with the dark-colored regions. In other non-limiting configurations, the at least one color-receptive layer 122 can be deposited such that only the light regions of the printed or colored layer 124 are covered; however, this is not required. In such configurations, it is likely easier to apply the layer of coloring media 126 to the portions of the color-receptive layer 122 located above the light components of printed or colored layer 124.

In some non-limiting embodiments, the at least one support layer 120 is applied to substantially the entire back surface 110 of the panel body 102 (including substantially the entire back surface of the sheet of panel body material used to form the panel body). In other non-limiting embodiments, the at least one support layer 120 is applied to only those portions of the back surface 110 of the panel body 102 where the recessed portions of one or more indicia (such as indicia 115a-115e) are located; however, this is not required.

The support layer 120 can be transparent, opaque, clear, solid colored, and/or multi-colored without departing from the scope of the present disclosure. In some non-limiting embodiments, the support layer is clear and substantially transparent. In other non-limiting embodiments, the support layer 120 is gold in color. Moreover, the particular material used to form the support layer 120 is non-limiting. However, the support layer material should generally possess properties and characteristics which act to protect the back surface of the panel body and/or to reinforce the panel body 102 (e.g., stiffen areas of the panel body 102 where the raised and recessed portions of indicia 113a-113e and 115-115e are located).

The at least one coloring media color-receptive layer 122 can provide any desired surface finish without departing from the scope of the present disclosure. For example, the color-receptive layer can be made from a material that provides a glossy, matte, or goffered surface finish. However, in any event, the color-receptive layer 122 is configured to permit the permanent transfer of coloring media from a coloring media device to the color-receptive layer, thus forming the layer of color media 126 on the panel body 102. As used herein, the terms 'permanent transfer' generally means the application of a coloring media that sticks to and does not easily wipe off from a surface to which the coloring media is applied. The particular coloring media and coloring media device used are non-limiting and may include any number of colored oil-based (i.e., permanent) markers, water-based (i.e., removable) markers, ink, etc.

In some non-limiting embodiments, the media color-receptive layer 122 is made from a material specially adapted to permit the transfer of coloring media from a coloring media device to the color-receptive layer. In such embodiments, the at least one color-receptive layer 122 can be made from any material selected from a number of coatings, paints, sealing agents, etc., known in the art. In some non-limiting configurations, one or more additives can be provided which, when combined with one of the coatings, paints, sealing agents, etc., described above, provides the properties and characteristics necessary for suitable coloring media transfer. For example, additives can be provided to enhance a matte surface finish of the media color-receptive layer 122 which is more receptible to the transfer of coloring media; however, this is not required. In other such non-limiting configurations, the at least one color-receptive layer 122 can be formed to include one or more surface features (not shown) which achieve suitable transfer of coloring media from the media device to the color-receptive layer. For example, a surface roughness of the material can be altered to provide the media color-receptive layer 122 with a texturized surface that is more receptive to the transfer of coloring media.

In other non-limiting embodiments, a material which possesses properties and characteristics suitable for coloring media transfer is used to form the color-receptive layer 122. For example, materials which provide the color-receptive layer 122 with a matte finish can be used. In one particular non-limiting embodiment, the material used to form the color-receptive layer 122 comprises a blend of a polyester resin and heavy aromatics. Some suitable, non-limiting examples of polyester materials include polyethyleneterephthalates and polyethylenenaphthalates. As can be appreciated, other polymer or polymer combinations can be used.

The material used to form the at least one color-receptive layer 122 and the at least one support layer 120 can be the same or different. One exemplary material which may be used to form one or both of the at least one support layer 120 and at least one coloring-media color-receptive layer 122 includes, but is not limited to, polymeric materials. In some non-limiting embodiments, the polymeric material may be comprised of a single polymer layer or may be comprised of several polymer layers of same or different composition. A layer of the polymeric support sheet can be a thermoplastic polymer layer or can be a cross-linked polymer layer. Also, a combination of thermoplastic polymer layers and cross-linked polymer layers may be used. However, such configurations are non-limiting.

Other exemplary non-limiting polymeric materials that may be used in one or both of the at least one support layer 120 and at least one coloring-media color-receptive layer 122 include thermoplastic polymers (such as polycarbonates), poly(meth)acrylates (such as polymethyl methacrylate), polyolefins (such as polyethylene and polypropylene), polyesters (such as polyethyleneterephthalates and polyethylenenaphthalates), cellulose acetate, polyvinyl chloride, and copolymers of acrylonitrile, styrene and butadiene.

In some non-limiting embodiments, one or both of the at least one support layer 120 and at least one coloring media color-receptive layer 122 are made to be cold-formable. In connection with the present disclosure, the term 'cold-formable' means that raised and recessed indicia (such as the raised indicia 113a-113e and recessed indicia 115a-115e illustrated in FIGS. 1 and 2 and described above) can be formed in one or both of the support layer 120 and color-receptive layer 122 at ambient temperature. Such cold-forming may be performed, for example, through embossing or deep drawing. A non-limiting example of a cold-formable material includes polymeric sheets comprising polycarbonate. In other non-limiting examples, a cold-formable material may be obtained from a multi-layer construction including one or more thermoplastic polymers enumerated above and one or more layers of a cross-linkable material. In still further non-limiting examples, a cold-formable support layer and/or color-receptive layer may comprise one or more layers that comprise a cross-linkable thermoplastic polymer composition. In the non-cross-linked state, the polymeric support sheet and/or media color-receptive layer can be readily cold-formed to provide indicia therein. Subsequent to forming the indicia, the cross-linkable thermoplastic polymer composition can be cross-linked such that the support/color-receptive layer(s) loses its thermoplastic properties.

Figure 4:
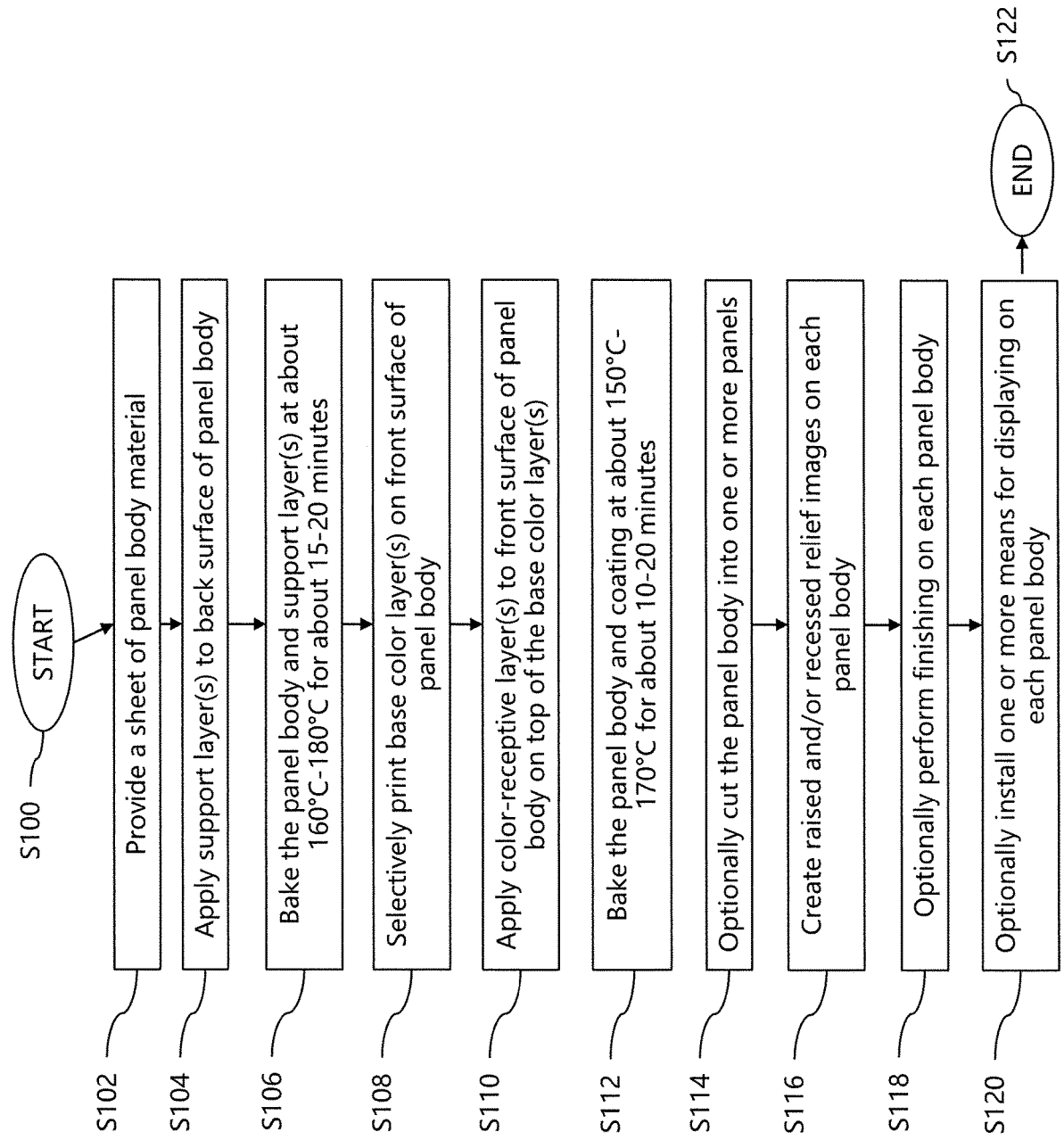
FIG. 4 is an illustration according to another non-limiting embodiment of the present disclosure which shows a flow-chart of process steps used in the manufacturing of an article having the features shown in FIGS. 1-3 and described below; and, FIG. 5 is an illustration according to another non-limiting embodiment of the present disclosure which shows a flow-chart of process steps used in the manufacturing of an article having the features shown in FIGS. 1-3 and described below.

Referring now to FIG. 4, there is illustrated a flowchart for a non-limiting method of manufacturing a sheet or body of artwork as described above. The method starts at S100.

At S102, a sheet of panel body material is provided. The sheet of panel body material is used to form one or more finished panel bodies (such as panel body 102 discussed above and shown in FIGS. 1-3). The sheet of panel body material can be optionally sized to permit a plurality of panels to be cut therefrom; however, this is not required. The sheet of panel body material can be provided from commercial suppliers in a pre-cut, stacked configuration; however, such a configuration is non-limiting. The sheet of panel body material is typically made of a durable material such as metal, plastic, etc. In some non-limiting embodiments, the sheet of panel body material is made from a metal (e.g., tin or tinfoil, aluminum, etc.). In other non-limiting embodiments, the sheet of panel body material is made from plastic. The sheet of panel body material generally has a planar or flat surface on the front and back surface and a uniform thickness.

At S104, at least one layer of support material (such as support material 120 discussed above and shown in FIG. 3) is applied to the back surface of the sheet of panel body material. In some non-limiting embodiments, the entire back surface of the sheet of panel body material is coated with the at least one support layer at S104. Any suitable method known in the art can be used to apply the at least one layer of support material to the back surface of the sheet of panel body material at S104 without departing from the scope of the present disclosure. In one non-limiting example, the support layer can be bonded to the sheet of panel body material through use of one or more adhesive layers. In another non-limiting example, the support layer and/or sheet of panel body material can be coated with one or more primer layers to ensure the firm adhesion of the support layer to the sheet of panel body material. In still an additional non-limiting example, the support layer can be directly applied as a coating composition to the back surface of the sheet of panel body material by printing, casting, hand rolling, spray coating, dip coating, or any other known coating techniques. In one non-limiting configuration, the support layer is formed from one or more coatings of a paint (e.g., gold paint, etc.) that are applied to the back surface of panel body material and optionally a clear polymer sealing layer is applied over the one or more layers of paint. In another non-limiting configuration, a coating of polymer sealant (e.g., clear or colored) is applied to the back surface. The one or more layers of support material are generally applied to the panel body when the back surface of the panel body is planar or flat. Generally, the thickness of the support material on the back surface is uniform.

Moving on to process step S106, a heating process is performed to dry, set, and/or cure the at least one previously applied layers and/or coatings of the support material to the sheet of panel body material in step S104. The heating process of S106 includes, but is not limiting to, heating the sheet of panel body material and support layer at a temperature and time to dry, set, and/or cure support material (e.g., about 160-180° C. for a period of about 15-20 minutes, etc.).

After the heating process of step S106, step S108 includes selectively printing a color layer on one or more areas of a front surface of the sheet of panel body material (i.e., such as a color layer 124 described above and illustrated in FIG. 3 as being selectively printed on front surface 108 of panel 102). The selective printing of the color layer at S108 is performed by any commonly known printing technique. For example, in some non-limiting embodiments, a thermal transfer process, such as thermal transfer printing or ink jet printing, can be used to print the color layer. In other non-limiting embodiments, the color layer can be cut from an adhesive film which is adhered on the front surface of the sheet of panel body material. In some non-limiting embodiments, the color layer is formed by printing or gluing on the front surface of the sheet of panel body material. In some non-limiting embodiments, the color layer is formed by stamp printing or painting on the front surface of the sheet of panel body material. In still further additional non-limiting embodiments, the color layer is formed by embedding the color within the back surface of the sheet of panel body material. The selective printing of the color layer at S108 can be optionally performed in one or more deposition steps in order to form one or more color components in the color layer. For example, a first deposition step can deposit a first light-colored region (e.g., a white component, etc.) of the color layer and a second deposition step can deposit a second dark-colored region (e.g., a black component, etc.) of the color layer. However, such a configuration is non-limiting.

The color layer at S108 can be used to form one or more designs, words and lettering, patterns, artworks, and/or drawings (aka "indicia") on the front surface of the material sheet in a 2D manner. Each of the 2D indicia created at S108 typically includes 2D details. The 2D details may or may not correspond to at least one of the 3D indicia created at step S114 below. The color layer is generally applied to the panel body when the front surface of the panel body is planar or flat. Generally, the thickness of the color layer on the front surface is uniform.

At S110, the exemplary method includes applying at least one coating of color-receptive layer on or above the front surface of the sheet of panel body material (such as color-receptive layer 122 described above and illustrated in FIG. 3 as being applied to the front surface 108 of panel 102). Generally, the color layer is allowed to fully dry, set, and/or adhere to the panel body prior to the at least one coating of color-receptive layer being applied on or above the front surface of the panel body. In some non-limiting embodiments of S110, the at least one color-receptive layer is deposited on top of the color layer deposited at S108. In such embodiments, the color-receptive layer is applied such that it at least partially or fully covers both the color layer and the front surface of the sheet of panel body material. The material of the color-receptive layer can be a glossy coating, semi-gloss, satin, matte coating, goffered coating, egg shell, etc. Generally, the coating is a polymer coating. The coating of color-receptive layer can be applied by any process (e.g., painting, spray coating, dipping, etc.). After the coating of color-receptive layer is applied, it is generally heated or heated to dry, set, and/or cure (e.g., heated at 150-180° C. for 10-20 minutes, etc.) as illustrated in S112. The composition of the color-receptive layer is generally different from the composition of the support layer; however, this is not required.

After S112, the sheet of panel body material has the at least one support layer applied from step S104, the color layer printed from S108, and the at least one receptive coating applied from S110. Thus, at S114, one or more individual panels can be optionally cut from the sheet of panel body material. The manner of cutting is non-limiting and can include any known automated or manual cutting technique. As can be appreciated, the optionally cutting can occur after S116.

At manufacturing step S116, one or more raised relief portions are optionally formed in the front surface of the panel body. In addition, one or more recessed relief portions can be optionally simultaneously formed in the back surface of the panel body, with each one of the one or more raised relief portions corresponding to one of the one or more recessed relief portions, since the recessed portions are a reverse and/or flipped image of the raised portions. The one or more raised and recessed relief portions (when used) form one or more designs, words and lettering, patterns, artworks, and/or drawings disposed on the front and back surfaces of the panel body in a 3D manner. As defined herein, the sheet of panel body material does not include 3D indicia until one or more portions of the panel body are formed such that the front surface and/or back surface are no longer flat or planer. As discussed above with respect to step S108, the 2D indicia can optionally include 2D details that correspond to at least one of the 3D indicia. A portion of the 3D indicia can optionally be formed at a location adjacent to and/or on the location of the 2D indicia, such that the 2D indicia are at least partially converted into a 3D image after formation of the raised and recessed relief portions. Step S116, in other words, is directed to the forming of 3D indicia. The 3D indicia can be formed by a stamping process, embossing processing, thermoforming process, or other process. When the 3D image is formed by a stamping process, such a process is generally used on a panel body formed of metal. When an embossing process is used, such a process is generally used on a panel body formed of metal. When a stamping or embossing process is used, the 3D indicia are generally raised against the formerly generally flat, planar front surfaces of the panel body and the corresponding 3D indicia are generally sunken into the formerly generally flat, planar back surfaces of the panel body. The stamping and embossing processes are typically carried out at ambient temperature (e.g., 60-80° F.) by pressing a template having a representation of the 3D indicia on the panel body; however, this is not required. In other non-limiting embodiments, the raised/recessed indicia may be formed by one or more thermoforming operations. Thermoforming generally includes subjecting the panel body to heat while pressing a template representing the 3D indicia on the panel body. When the panel body is formed of metal or plastic, step S116 can be accomplished by thermoforming. As a result of step S116, raised surfaces representing the 3D indicia are formed on the panel body.

In some non-limiting embodiments, the forming of the one or more raised and recessed relief portions at S116 can be performed prior to the cutting of the sheet of panel body material into individual panels.

At S118, one or more finishing steps are optionally applied to the panel body. The one or more finishing steps include, but are not limited to, applying cold working steps (such as rolling) and mechanical working steps (such as grinding). For example, rolling can be performed on the sides and corners of each panel body to produce rounded edges and corners that improve the usability, ergonomics, and safety of the panel body. Grinding can be performed to eliminate any surface irregularities on the panel body, as well as to reduce any sharp edges and corners remaining on the panel body.

Next, at S120, one or more means for displaying can be optionally installed which permits the easy viewing of a finished panel artwork. The installation of one or more means for displaying includes, but is not limited to, drilling a through-hole in the panel body that extends between the front and back surfaces thereof. A nail, screw, or other fastener means can then be inserted into the through-hole so that the panel body can be hung from a wall, for example. The installation of one or more means for displaying can also include attaching a means for hanging the panel adjacent an outer perimeter edge of the panel body on the back surface thereof. The method for forming the manufacturing a sheet or body of artwork ends at S122.

Once the panel body is fully formed, it can be packaged for distribution or sale. The fully formed panel body can be provided to a user to allow the user to apply or transfer coloring media to the fully formed panel body to form a customized color image on the color media color-receptive layer. The user can use one or more coloring media, such as a marker or the like, to draw or otherwise apply the coloring media to the color-receptive layer. The dark-colored regions can be used to function as borders and/or designate regions of the panel body for the user to color. Generally, the dark-colored region is of a color that substantially does not change color when a coloring media such as an ink marker is applied to the dark-colored region. The light-colored region is of a color that fully or substantially allows the coloring media to display the color of the coloring media. As such, a layer of coloring media can be applied to the at least one media color-receptive layer applied in step S110 above. Such application of coloring media is made possible by the color-receptive layer, which is configured to receive the transfer of coloring media from a device to the color-receptive layer as described in further detail above. In some non-limiting embodiments of applying coloring media, the color layer printing step and/or the color-receptive layer coating step described above at S108 and S110 results in the formation of light-colored regions and dark-colored regions. In such configurations, a non-limiting exemplary step includes applying coloring media to portions of the color-receptive layer that covers or forms the light-colored regions. Similarly, a non-limiting exemplary step includes avoiding the application of coloring media to portions of the color-receptive layer that cover the dark-colored regions.

Figure 5:
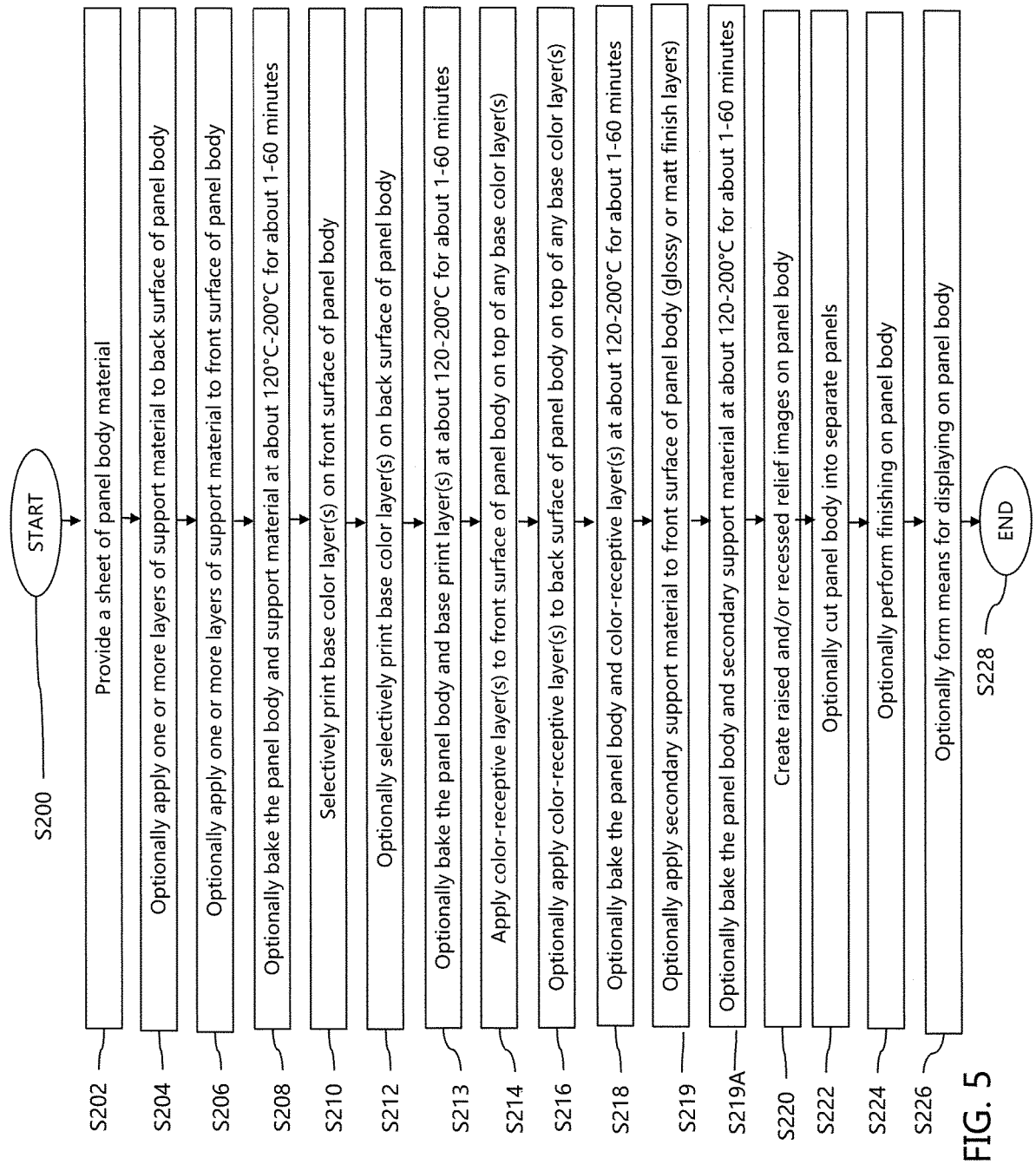

Referring now to FIG. 5, there is illustrated a flowchart for another non-limiting method of manufacturing a sheet or body of artwork as described above. The method starts at S200.

At S202, a sheet of panel body material is provided. The sheet of panel body material is used to form one or more finished panel bodies (such as panel body 102 discussed above and shown in FIGS. 1-3). The sheet of panel body material can be optionally sized to permit a plurality of panels to be cut therefrom. The sheet of panel body material is generally provided from commercial suppliers in a pre-cut, stacked configuration; however, such a configuration is non-limiting. The sheet of panel body material generally is a one-piece sheet having a uniform composition. As illustrated in S202, the sheet of panel body material is made of metal, such as, but not limited to, tin or aluminum plate. The sheet of panel body material that forms the planar body generally has a planar or flat surface on the front and back surface and has a uniform thickness. The thickness of the sheet of panel body material is generally is at least 0.2 mm, and typically 0.3-1.8 mm. The thickness of the sheet of panel body material is generally greater than the thickness of the support material as described below. The thickness of the sheet of panel body material is generally greater than the thickness of the color layer as described below. The thickness of the sheet of panel body material is generally greater than the thickness of the color-receptive layer as described below. In one arrangement, the thickness of the sheet of panel body material is greater than the combined thickness of the support material, color layer, and color-receptive layer.

Next, at S204, at least one layer of support material (such as support material 120 discussed above and shown in FIG. 3) is optionally applied to a portion or all of the back surface of the sheet of panel body material. In some non-limiting embodiments, the entire back surface of the sheet of panel body material is coated with the at least one layer of support material. Any suitable method known in the art can be used to apply the at least one layer of support material to the back surface of the sheet of panel body material. In one non-limiting example, the one or more layers of support material can be bonded to the sheet of panel body material through use of one or more adhesive layers. In another non-limiting example, the one or more layers of support material and/or sheet of panel body material can be coated with one or more primer layers to ensure the firm adhesion of the one or more layers of support material to the sheet of panel body material. In still an additional non-limiting example, the one or more layers of support material can be directly applied as a coating composition to the back surface of the sheet of panel body material by printing, casting, hand rolling, spray coating, dip coating, or any other known coating techniques. In one non-limiting configuration, the one or more layers of support material include a coating of a paint (e.g., gold paint, etc.) that is applied to the back surface and optionally a clear polymer sealing layer is applied over the layer of paint. In another non-limiting configuration, the one or more layers of support material include a coating of polymer sealant (e.g., clear or colored) that is applied to the back surface. The one or more layers of support material are generally applied to the panel body when the back surface of the panel body is planar or flat. Generally, the thickness of the one or more layers of support material on the back surface is uniform. The thickness of the one or more layers of support material on the back surface is generally less than 1 mm (e.g., 0.0001-0.5 mm and all values and ranges therebetween). Generally, the composition of the one or more layers of support material is different from the color-receptive layer as describe in steps S214 and S216; however, this is not required. In one non-limiting embodiment, after the one or more layers of support material are applied, the color of the back surface has a generally uniform single color; however, this is not required.

One or more layers of support material can optionally be applied to the front surface of the panel body as illustrated in step S206. When one or more layers of support material are applied to the front surface, the one or more layers of support material can be applied prior to, during, or after the one or more layers of support material are applied to the back surface. Generally, the composition of the one or more layers of support material, when applied to both the front and back surfaces, is the same; however, this is not required. In some non-limiting embodiments, the entire front surface of the sheet of panel body material is coated with the at least one layer of support material. Any suitable method known in the art can be used to apply the at least one layer of support material to the front surface of the sheet of panel body material. In one non-limiting example, the one or more layers of support material can be bonded to the sheet of panel body material through use of one or more adhesive layers. In another non-limiting example, the one or more layers of support material and/or sheet of panel body material can be coated with one or more primer layers to ensure the firm adhesion of the one or more layers of support material to the sheet of panel body material. In still an additional non-limiting example, the one or more layers of support material can be directly applied as a coating composition to the front surface of the sheet of panel body material by printing, casting, hand rolling, spray coating, dip coating, or any other known coating techniques. The one or more layers of support material are generally applied to the panel body when the front surface of the panel body is planar or flat. Generally, the thickness of the one or more layers of support material on the front surface is uniform. The thickness of the one or more layers of support material on the front surface is generally less than 1 mm (e.g., 0.0001-0.5 mm and all values and ranges therebetween).

Moving on to process step S208, if one or more layers of support material are applied to the front and/or back surface of the panel body, a heating (e.g., baking) process is optionally performed to dry, set, and/or cure the one or more previously applied layers and/or coatings of the support material to the sheet of panel body material in steps S204 and S206. The heating process of S208 includes, but is not limiting to, heating the sheet of panel body material and the one or more layers of support material at a temperature and time to dry, set, and/or cure support material (e.g., about 120-200° C. [and all values and ranges therebetween] for a period of about 1-60 minutes [and all values and ranges therebetween], etc.).

After the optional heating process of step S208, step S210 includes selectively printing a color layer on one or more areas of a front surface of the sheet of panel body material (i.e., such as a color layer 124 described above and illustrated in FIG. 3 as being selectively printed on front surface 108 of panel 102). The selective printing of the color layer is performed by any commonly known printing technique. For example, in some non-limiting embodiments, a thermal transfer process, such as thermal transfer printing or ink jet printing, can be used to print the color layer. In other non-limiting embodiments, the color layer can be cut from an adhesive film which is adhered on the front surface of the sheet of panel body material. In some non-limiting embodiments, the color layer is formed by printing or gluing the colored layer on the front surface of the sheet of panel body material. In some non-limiting embodiments, the color layer is formed by stamp printing or painting on the front surface of the sheet of panel body material. In still further additional non-limiting embodiments, the color layer is formed by embedding the color within the back and/or front surface of the sheet of panel body material. In still further additional non-limiting embodiments, the color layer is spray coated or painted on the front surface of the sheet of panel body material. The selective printing of the color layer at S210 can optionally be performed in one or more deposition steps in order to form one or more color components in the color layer. For example, a first deposition step can deposit a first light-colored region (e.g., a white component, etc.) of the color layer and a second deposition step can deposit a second dark-colored region (e.g., a black component, etc.) of the color layer. However, such a configuration is non-limiting. In one non-limiting embodiment, only one or more dark-colored region are formed on the front surface. The dark-colored region can be applied directly to the front surface of the panel body, and/or be applied to the top surface of any support layer applied to the front surface of the panel body. In another non-limiting embodiment, one or more dark-colored regions and one or more light-colored regions are applied directly to the front surface of the panel body and/or be applied to the top surface of any support layer applied to the front surface of the panel body. Generally, the dark-colored region covers or overlies at least 1% and no more than about 70% of the front surface of the panel body (e.g., 1-50% and all values and ranges therebetween), and typically about 2-35%. When both dark- and light-colored regions are formed, generally the light-colored region covers or overlies more of the front surface of the panel body than the dark-colored regions; however, this is not required. The color layer at S210 can be used to form one or more designs, words and lettering, patterns, artworks, and/or drawings (aka "indicia") on or above the front surface of the material sheet in a 2D manner. Each of the 2D indicia created at S210 typically includes 2D details. The 2D details may or may not correspond to at least one of the 3D indicia created at step S220 below. The color layer is generally applied to the panel body when the front surface of the panel body is planar or flat. Generally, the thickness of the color layer on the front surface is uniform. The thickness of the color layer is generally less than 1 mm (e.g., 0.00001-0.5 mm and all values and ranges therebetween). The composition of the color layer is generally different from the composition of any support layer or color-receptive layer.

Step S212 includes optionally selectively printing a color layer on one or more areas of a back surface of the sheet of panel body material (i.e., such as a color layer 124 described above). The color layer can be applied prior to, during, or after the color layer of step 210 is applied. The selective printing of the color layer is performed by any commonly known printing technique. The selective printing of the color layer at S212 can optionally be performed in one or more deposition steps in order to form one or more color components in the color layer. The color layer can cover or overlay 0.1-100% (and all values and ranges therebetween) of the back surface of the panel body. The color layer at S212 can optionally be used to form one or more designs, words and lettering, patterns, artworks, and/or drawings (aka "indicia") on or above the back surface of the material sheet in a 2D manner. The color layer is generally applied to the panel body when the back surface of the panel body is planar or flat. Generally, the thickness of the color layer on the back surface is uniform. The thickness of the color layer is generally less than 1 mm (e.g., 0.00001-0.5 mm and all values and ranges therebetween). The composition of the color layer is generally different from the composition of any support layer or color-receptive layer.

At step S213, the color layers can optionally be subjected to a heating (e.g., baking) process to dry, set, and/or cure the one or more color layers on the sheet of panel body material that were applied in steps S210 and S212. The heating process of S213 includes, but is not limiting to, heating the sheet of panel body material and the one or more color layers at a temperature and time to dry, set, and/or cure the color layers (e.g., about 120-200° C. [and all values and ranges therebetween] for a period of about 1-60 minutes [and all values and ranges therebetween], etc.).

At step S214, the exemplary method includes applying one or more coatings of color-receptive layer on or above the front surface of the sheet of panel body material (such as such color-receptive layer 122 described above and illustrated in FIG. 3 as being applied to the front surface 108 of panel 102). Generally, any color layer that is applied in step S210 is allowed to fully dry, set, and/or adhere to the panel body prior to the at least one coating of color-receptive layer is applied on or above the front surface of the panel body; however, this is not required. In some non-limiting embodiments, the one or more color-receptive layers are deposited partially or fully on top of the color layer deposited at S210. In such embodiments, the color-receptive layer is applied such that it at least partially or fully covers both the color layer and the front surface of the sheet of panel body material. The material of the color-receptive layer can be a glossy coating, semi-gloss, satin, matte coating, goffered coating, egg shell, etc. Generally, the coating is a polymer coating. In one non-limiting embodiment, the color-receptive layer is clear, transparent, or a semi-transparent. The coating of color-receptive layer can be applied by any process (e.g., painting, spray coating, dipping, etc.). The thickness of the color-receptive layer is generally less than 1 mm (e.g., 0.00001-0.5 mm and all values and ranges therebetween). The composition of the color-receptive layer is generally different from the composition of the support layer and/or color layer, however, this is not required.

At step S216, the exemplary method includes optionally applying one or more coatings of color-receptive layer on or above the back surface of the sheet of panel body material. Generally, the color layer is allowed to fully dry, set, and/or adhere to the panel body prior to the at least one coating of color-receptive layer being applied on or above the front surface of the panel body; however, this is not required. In some non-limiting embodiments, the one or more color-receptive layers are deposited partially or fully on top of the color layer optionally deposited at S212. The material of the color-receptive layer can be a glossy coating, semi-gloss, satin, matte coating, goffered coating, egg shell, etc. Generally, the coating is a polymer coating. In one non-limiting embodiment, the color-receptive layer is clear, transparent, or semi-transparent. The coating of color-receptive layer can be applied by any process (e.g., painting, spray coating, dipping, etc.). The thickness of the color-receptive layer is generally less than 1 mm (e.g., 0.00001-0.5 mm and all values and ranges therebetween). The composition of the color-receptive layer is generally different from the composition of the support layer and/or color layer, however, this is not required.

After the color receptive coating of color-receptive layer is applied to the front surface and optionally the back surface, the color receptive coating is optionally heated or heated to dry, set, and/or cure as illustrated in step S218. The heating process of S218 includes, but is not limiting to, heating the sheet of panel body material and the color-receptive layer at a temperature and time to dry, set, and/or cure color-receptive layer (e.g., about 120-200° C. for a period of about 1-60 minutes, etc.).

After S218, the sheet of panel body material optionally has one or more layers of secondary support material applied to the front and/or rear surface of the panel body as set forth in step S219. The one or more layers of secondary support material that are optionally applied to a portion or all of the front and/or back surfaces of the panel body after the one or more color receptive layers are applied to the panel body can be the same of different to the support material described with respected to steps S204 and S206, or the color receptive layers described with respect to steps S214 and S216; however, this is not required. Any suitable method known in the art can be used to apply the one or more layers of secondary support material to panel body material. Generally, the thickness of the one or more layers of secondary support material on the back surface is uniform. The thickness of the one or more layers of secondary support material on the back surface is generally less than 1 mm (e.g., 0.0001-0.5 mm and all values and ranges therebetween).

If one or more layers of secondary support material are applied to the front and/or rear surface of the panel body as set forth in step S219, the panel body can be optionally heated as set forth in step S219A. The heating (e.g., baking) process is performed to dry, set, and/or cure the one or more layers of secondary support material. The heating process includes, but is not limiting to, heating the sheet of panel body material and the one or more layers of secondary support material at a temperature and time to dry, set, and/or cure the secondary support material (e.g., about 120-200° C. [and all values and ranges therebetween] for a period of about 1-60 minutes [and all values and ranges therebetween], etc.).

At manufacturing step S220, one or more raised relief portions are formed in the front surface of the panel body to form 3D indicia. In addition, one or more recessed relief portions can be optionally simultaneously formed in the back surface of the panel body, with each one of the one or more raised relief portions corresponding to one of the one or more recessed relief portions, since the recessed portions are a reverse and/or flipped image of the raised portions. The one or more raised and recessed relief portions (when used) form one or more designs, words and lettering, patterns, artworks, and/or drawings disposed on the front and back surfaces of the panel body in a 3D manner. The 2D indicia can optionally include 2D details that correspond to at least one of the 3D indicia. A portion of the 3D indicia are can optionally be formed at a location adjacent to and/or on the location of the 2D indicia, such that the 2D indicia are at least partially converted into a 3D image after formation of the raised and recessed relief portions. The 3D indicia can be formed by a stamping process, embossing processing, thermoforming process, or other process.

At step S222, the sheet of panel body material can optionally be cut into one or more panels after the forming of the one or more raised and recessed relief portions at S220. As can appreciated, the sheet of panel body material can be cut prior to the forming of the raised and recessed relief portions at S220, or can be cut after some, but not all, of the raised and recessed relief portions are formed at S220.

At step S224, one or more finishing steps are optionally applied to the panel body. The one or more finishing steps include, but are not limited to, applying cold working steps (such as rolling) and mechanical working steps (such as grinding). For example, rolling can be performed on the sides and corners of each panel body to produce rounded edges and corners that improve the usability, ergonomics, and safety of the panel bodies. Grinding can be performed to eliminate any surface irregularities on the panel body, as well as to reduce any sharp edges and corners remaining on the panel body. These finishing steps can be performed at any time during the process of forming the panel body for displaying artwork as described above.

At step S226, one or more means for displaying can be optionally installed on the panel body which permits the easy viewing of a finished panel artwork. The installation of one or more means for displaying includes, but is not limited to, drilling a through-hole in the panel body that extends between the front and back surfaces thereof. A nail, screw, or other fastener means can then be inserted into the through-hole so that the panel body can be hung from a wall, for example. The installation of one or more means for displaying can also include attaching a means for hanging the panel adjacent an outer perimeter edge of the panel body on the back surface thereof.

Once the panel body is fully formed, the manufacturing process is completed as indicated by S228. The fully formed panel body can optionally be packaged for distribution or sale. The fully formed panel body can be provided to a user to allow the user to apply or transfer coloring media to the fully formed panel body. The user can use one or more coloring media, such as a marker or the like, to draw or otherwise apply the coloring media to the color-receptive layer. The dark color regions can be used to function as borders and/or designate regions of the panel body for the user to color or not to color.

While considerable emphasis has been placed herein on the structures and configurations of the preferred embodiments of the disclosure, it will be appreciated that other embodiments, as well as modifications of the embodiments disclosed herein, can be made without departing from the principles of the disclosure. These and other modifications of the preferred embodiments, as well as other embodiments of the disclosure, will be obvious and suggested to those skilled in the art from the disclosure herein, whereby it is to be distinctly understood that the foregoing descriptive matter is to be interpreted merely as illustrative of the present disclosure and not as a limitation thereof.

What is claimed:

1. A method of manufacturing an article configured as a panel of artwork comprising:
   (a) providing a single sheet of panel body material having a front surface and a back surface, said single sheet of panel body material having a planar or flat surface on said front and back surface;
   (b) applying 2D indicia on the front surface of said single sheet of panel body material, said 2D indicia at least partially formed by applying ink, paint or combinations thereof to said front surface;
   (c) applying at least one color-receptive layer to said front surface such that the at least one color-receptive layer partially covers the 2D indicia on said front surface of said sheet of panel body material; and,
   (d) forming 3D indicia in said front and back surfaces of said sheet of panel body material by deforming the single sheet of panel body material to form one or more non-flat surfaces on said front surface such that said at least one color-receptive layer at least partially covers said 3D indicia on said front surface of said sheet of panel body material, said 3D indicia positioned inwardly from outer edges of said single sheet, said single sheet generally maintaining its original shape except for said 3D indicia form on said single sheet.

2. The method as defined in claim 1, further comprising applying at least one support layer to the back surface of the panel body prior to said step of forming 3D indicia.

3. The method as defined in claim 2, further comprising heating the panel body and at least one support layer applied thereto at a temperature of at least 90° C. for a period of at least 2 minutes.

4. The method as defined in claim 1, wherein said 3D indicia is at least applied on regions of said panel body that include said 2D indicia.

5. The method as defined in claim 1, wherein said 2D includes both at least one light-colored region and at least one dark-colored regions, said at least one color-receptive layer covering 50-100% of said at least one light-colored region on said front surface of said panel body.

6. A method of manufacturing an article configured as a panel of artwork that includes the steps of:
   a) providing a single sheet of panel body material having a front surface and a back surface, said single sheet of panel body material having a planar or flat surface on said front and back surface and having a uniform thickness;
   b) applying 2D indicia on the front surface of the single sheet of panel body material, said 2D indicia at least partially formed by applying ink, paint or combinations thereof to said front surface;
   c) applying one or more color-receptive layers to the front surface of the sheet of panel body material such that the one or more color-receptive layers at least partially cover the front surface of the sheet of said panel body material and at least partially covers the 2D indicia on the front surface of the sheet of said panel body material;
   d) heating the one or more color-receptive layers on the sheet of said panel body material; and,
   e) forming 3D indicia in the front and back surfaces of the sheet of said panel body material by deforming the single sheet of panel body material to form one or more non-flat surfaces on said front surface, said 3D indicia positioned inwardly from outer edges of said single sheet, said single sheet generally maintaining its original shape except for said 3D indicia form on said single sheet.

7. The method as defined in claim 6, further including the steps of applying one or more support layers on the front and/or back surface of the sheet of said panel body material.

8. The method as defined in claim 7, further including the step of heating said one or more support layers on said sheet of said panel body material.

9. The method as defined in claim 6, further including the step of applying 2D indicia on the back surface of the sheet of said panel body material.

10. The method as defined in claim 6, further including the step of applying one or more color-receptive layers to the back surface of the sheet of said panel body material such that the one or more color-receptive layers at least partially cover the back surface of the sheet of said panel body material and optionally at least partially covers any optional 2D indicia on the back surface of the sheet of said panel body material.

11. The method as defined in claim 6, further including the step of cutting the sheet of said panel body material into two or more panels.

12. The method as defined in claim 6, further including the step of performing a finishing on the sheet of said panel body material or two or more panels.

13. The method as defined in claim 6, further including the step of forming a means for displaying on the sheet of panel body material or two or more panels.

14. The method as defined in claim 6, further including the step of heating the one or more support layers at a temperature of at least 90° C. for a period of about 0.1-120 minutes.

15. A method of manufacturing an article configured as a panel of artwork, wherein said method includes the steps of:
    a) providing a sheet of panel body material having a front surface and a back surface, said single sheet of panel body material having a planar or flat surface on said front and back surface and having a uniform thickness;
    b) applying one or more support layers on said front and/or back surface of said sheet of said panel body material;

c) heating said one or more support layers;

d) applying 2D indicia on said front surface of said sheet of panel body material, said 2D indicia at least partially formed by applying ink, paint or combinations thereof to said front surface, said 2D indicia including a first coating and a second coating, said first coating at least partially overlying said front surface, said second coating at least partially overlying said front surface, said first coating having a lighter color than a color of said second coating, said second coating overlying 1% to 70% of said front surface;

e) applying one or more color-receptive layers to said front surface of said sheet of said panel body material such that said one or more color-receptive layers at least partially cover said front surface of said sheet of said panel body material, said one or more color-receptive layers at least partially covering the 2D indicia on the front surface of the sheet of said panel body material, said color-receptive layers are clear, transparent, or semi-transparent, a composition of said color-receptive layers is different from a composition of said first and second coatings of said 2D indicia;

f) heating said one or more color-receptive layers on said sheet of said panel body material; and, g) forming a plurality of 3D indicia in said front and back surfaces of said sheet of said panel body material by deforming the single sheet of panel body material to form one or more non-flat surfaces on said front surface, said single sheet generally maintaining its original shape except for said 3D indicia form on said single sheet once said panel of artwork is fully formed.

16. The method as defined in claim 15, wherein said step of heating said one or more support layers includes heating said one or more support layers at a temperature of at least 90° C. for a period of 0.1-120 minutes.

17. The method as defined in claim 15, wherein said step of applying 2D indicia on said front surface of said sheet includes fully coving said front surface of said sheet of said panel body material with said first coating and applying said second coating on a top surface of said first coating.

18. The method as defined in claim 15, wherein said further includes the step of heating said 2D indicia on said front surface of said sheet of panel body material at 120-200° C. for 1-60 minutes.

19. The method as defined in claim 15, wherein said step of heating said one or more color-receptive layers is at least 90° C. for at least 0.5 minutes.

20. The method as defined in claim 15, wherein said step of applying one or more color-receptive layers to said front surface of said sheet includes at least partially covering said 2D indicia on said front surface of the sheet of said panel body material with said one or more color-receptive layers.

21. The method as defined in claim 15, wherein said further includes the step of cutting the sheet of said panel body material into two or more panels.

22. The method as defined in claim 15, wherein said further includes the step of performing a finishing on the sheet of said panel body material or two or more panels.

23. The method as defined in claim 15, wherein said further includes the step of forming a means for displaying on the sheet of panel body material or two or more panels.

24. The method as defined in claim 15, wherein said second color corresponds to Pantone® Black, Black 2, Black 2 2X, Black 3, Black 3 2X, Black 4, Black 4 2X, Black 5, Black 5 2X, Black 6, Black 6 2X, Black 7, Black 7 2X, PMS 412, PMS 419, PMS 426, PMS 433, PMS 433 2X, PMS 532, PMS 539, PMS 5395, PMS 546, PMS 5463, PMS 627, PMS 654, or PMS 655.

25. The method as defined in claim 15, wherein said panel body material is made of a metal material, said panel body having a thickness of at least 0.2 mm, said panel body having a thickness that is greater than a combined thickness of said color-receptive layer, said 2D indicia, and support layer, said support layer having a thickness of less than 1 mm, said color-receptive layer having a thickness of less than 1 mm, said 2D indicia having a thickness of less than 1 mm.

26. The method as defined in claim 15, wherein said support layer includes a metal or polymer material.

27. The method as defined in claim 15, wherein said 3D indicia on said front surface of said panel body is applied to 5-90% of a surface area of said front surface.

28. The method as defined in claim 15, wherein said 3D indicia positioned inwardly from outer edges of said single sheet, said single sheet generally maintaining its original shape except for said 3D indicia formed on said single sheet.

* * * * *